(12) United States Patent
Dobrean et al.

(10) Patent No.: US 10,445,183 B1
(45) Date of Patent: Oct. 15, 2019

(54) METHOD AND SYSTEM TO RECLAIM DISK SPACE BY DELETING SAVE SETS OF A BACKUP

(71) Applicant: EMC Corporation, Hopkinton, MA (US)

(72) Inventors: Adrian Dobrean, Oakville (CA); Dorota Zak, Mississauga (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 303 days.

(21) Appl. No.: 14/752,766

(22) Filed: Jun. 26, 2015

(51) Int. Cl.
*G06F 17/30* (2006.01)
*G06F 11/14* (2006.01)
*G06F 16/16* (2019.01)

(52) U.S. Cl.
CPC ........ *G06F 11/1448* (2013.01); *G06F 16/162* (2019.01)

(58) Field of Classification Search
CPC ....................................................... G06F 16/00
See application file for complete search history.

(56) References Cited

U.S. PATENT DOCUMENTS

| | | | |
|---|---|---|---|
| 8,346,731 B1 * | 1/2013 | Tsaur ................ | G06F 17/30321 707/673 |
| 8,924,355 B1 | 12/2014 | Kundzich et al. | |
| 2005/0246398 A1 * | 11/2005 | Barzilai ............... | G06F 11/1448 707/999.204 |
| 2007/0168401 A1 | 7/2007 | Kapoor et al. | |
| 2007/0208780 A1 * | 9/2007 | Anglin ................ | G06F 11/1469 707/999.2 |
| 2008/0034018 A1 * | 2/2008 | Cisler ................. | G06F 3/04847 707/999.202 |
| 2008/0307019 A1 | 12/2008 | Weiss et al. | |
| 2010/0293147 A1 | 11/2010 | Snow et al. | |
| 2013/0024423 A1 * | 1/2013 | Doshi ................. | G06F 11/1448 707/640 |
| 2013/0066839 A1 | 3/2013 | Westwood et al. | |
| 2015/0370643 A1 * | 12/2015 | Rueger ............... | G06F 11/1446 707/652 |
| 2016/0162364 A1 * | 6/2016 | Mutha .................. | G06F 3/0608 707/645 |

* cited by examiner

*Primary Examiner* — Khanh B Pham
(74) *Attorney, Agent, or Firm* — Womble Bond Dickinson (US) LLP

(57) ABSTRACT

Embodiments are described for improved management of backed up data from a client device to a storage device. The storage device may be coupled to a backup server across a network. A backup of data from an application on a client device to a storage device may fail while the backup is in progress. Systems and methods described herein can detect and remove incomplete backups. Systems and methods described herein can also scan for, and delete, save sets of a backups within a specified time interval. Systems and methods described herein can update metadata that describes existing backup data so that existing backups may be used with an updated or changed application software.

21 Claims, 16 Drawing Sheets

402→ Target = //storage_device/client_device/

| | Backup Storage 405 | | Metadata Database 410 | |
|---|---|---|---|---|
| 416→ | WRITE | target/app_comp1/dir/index/Saveset1.REC.LCK | | |
| 420→ | OPEN file | target/app_comp1/dir/Saveset1.SS | WRITE | target/app_comp1/dir/index/Saveset1.REC |
| 425→ | STORE | target/app_comp1/dir/Savefile1.SF to Saveset1.SS | WRITE | target/app_comp1/dir/index/keys/savefile/Savefile1 |
| 430→ | STORE | target/app_comp1/dir/Savefile2.SF to Saveset1.SS | WRITE | target/app_comp1/dir/index/keys/savefile/Savefile2 |
| 435→ | CLOSE file | target/app_comp1/dir/Saveset1.SS | | |
| 436→ | DELETE | target/app_comp1/dir/index/Saveset1.REC.LCK | | |
| | | | | |
| 440→ | WRITE | target/app_comp1/dir/index/Saveset2.REC.LCK | | |
| 441→ | OPEN file | target/app_comp2/dir/Saveset2.SS | WRITE | target/app_comp2/dir/index/Saveset2.REC |
| 445→ | STORE | target/app_comp2/dir/Savefile3.SF to Saveset2.SS | WRITE | target/app_comp2/dir/index/keys/savefile/Savefile3 |
| 450→ | STORE | target/app_comp2/dir/Savefile4.SF to Saveset2.SS | WRITE | target/app_comp2/dir/index/keys/savefile/Savefile4 |
| 455→ | CLOSE file | target/app_comp2/dir/Saveset2.SS | | |
| 456→ | DELETE | target/app_comp1/dir/index/Saveset2.REC.LCK | | |

*FIG. 4*

METHOD AND SYSTEM TO RECLAIM DISK SPACE BY DELETING SAVE SETS OF A BACKUP

RELATED APPLICATIONS

This application is related to co-pending U.S. patent application Ser. No. 14/752,717, entitled "Method and System to Detect and Delete Uncommitted Save Sets of a Backup," filed Jun. 26, 2015 and co-pending U.S. patent application Ser. No. 14/752,788, entitled "Method and System for Managing Metadata Records of Backups," filed Jun. 26, 2015. The disclosure of the above applications is incorporated by reference herein in its entirety.

TECHNICAL FIELD

This disclosure relates to the field of backing up data from a client device to a storage device and maintaining data related to backups. The storage device can be attached to a backup server.

BACKGROUND

A user of a computing system (or "client device") backs up data from the client device to a storage device to protect the data from loss. The data may be backed up on a per-application basis, per-file, as blocks of data, or as an image backup. A backup may include one or more save sets, each of which may contain one or more files or blocks of data. The backup target storage device may be coupled to the client device, or the target storage may be coupled to a backup server across a network, and the client device can be coupled to the backup server. During a backup of client device data to a target storage, a failure can happen that prevents the backup from completing. A failure can be a power failure or other a loss of communication with the target storage such as a loose or faulty cable, a backup server failure, or a target storage device failure. In such case, partial, incomplete data will remain on the storage device, taking up valuable storage space. A user may want to reclaim or "free-up" storage space on the storage device by deleting save sets and associated metadata from backups that never completed and/or backups that are very old.

In addition, a first version of an application software may back up data to a first target directory, and a newer, second version of the application may back up data to a second target directory. This is particularly problematic when a user performs a final backup of data generated by the first version of the application, before upgrading the application to the newer, second version of the application. If any problem occurs with the application data on the client device during the upgrade to the second, newer version of the application, the user may need to immediately restore the data from backup of the first version of the software. But, the data backed up using the first version of the application may not restore to the correct directory for the newer second application.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 4 illustrates, in block diagram form, data and metadata generated during a backup, according to some embodiments.

DETAILED DESCRIPTION

Figure 1:
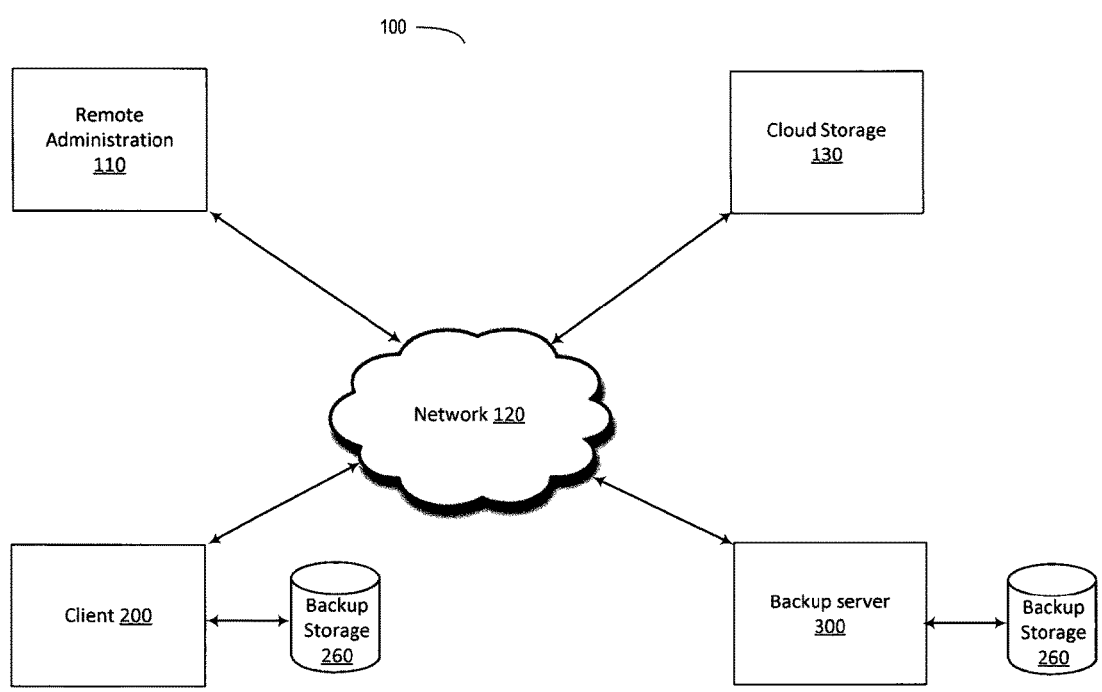
FIG. 1 illustrates, in block diagram form, a backup system infrastructure for use in backing up data from a client to a storage device, according to some embodiments.

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

According to one embodiment of the invention, a method of detecting and removing uncommitted save sets can include receiving a request at a target storage system to remove uncommitted backups that have been received from a source storage system. In response to the request, the method can scan a storage device to detect an indication on the storage device that a backup of a client device was begun, and was not completed. The method can further include identifying a first backup based on the indication. The first backup can include one or more save sets of backup data. The method can include deleting the backup data of the one or more save sets of the first backup. In an embodiment, detecting can include scanning at least a specified directory for the indication of the incomplete backup. In an embodiment, the indication can include a lock file, written to the storage device to signify the beginning of the backup. The method can further include deleting metadata associated with the incomplete backup. In an embodiment, before the deleting of the metadata, the method can further include looking up the metadata associated with the incomplete backup, using at least a portion of a filename of the lock file as a key to perform the look up. The method can also include deleting the indication from the storage device after the backup data of the one or more save sets has been deleted. In an embodiment, before deleting one or more save sets, then method can include scanning for one or more save sets within a directory, or a subdirectory of the directory where the indication was found on the storage device. The storage device can be attached to a backup server and the client device can be communicatively coupled to the backup server.

In an embodiment, a computer-implemented method of deleting save sets of a backup can include receiving a request to delete one or more save sets of a backup stored in a storage system. The storage system can store a plurality of backups from a plurality of clients. In response to the request, the method can determine one or more save sets on a storage device of the storage system. The one or more save sets can have been generated within a time interval specified by the request. The method can further include deleting the one or more save sets on the storage device. The method can also include deleting metadata associated with the one or more save sets. In an embodiment, the method can include searching for one or more save set metadata records within a database. In an embodiment, the one or more metadata records can have been generated within the specified time interval. The method further can include deleting one or more save sets referenced within the one or more metadata records.

In an embodiment, the method can also include scanning a predetermined directory of the specified storage device for one or more save sets each having a date/time stamp within the specified time interval. The specified time interval can include only a specified ending date and time. In an embodiment, the one or more metadata records can include a directory of keys. Each key can include a fully qualified pathname to a save set of the one or more save sets. Specifying the storage device can further include specifying a backup server to which the storage device is communicatively coupled. In an embodiment, determining one or more save sets can include determining save sets for a specified application. Determining one or more save sets can further include determining one or more save sets that were generated from data on a specified client device.

In still another embodiment, a method of managing metadata for backups can include determining that a format of metadata records of one or more backups performed by a backup application has changed from a first format to a second format. The method can also include identifying a first set of one or more backup metadata records having been generated in the first format by the backup application of a first version. The version can refer to the version of the backup application or the version of the application for which data is being backed up. The method can also include modifying the one or more metadata records of the first set to generate a second set of one or more backup metadata records in the second format. The method can then store the second set of the one or more backup metadata records in a storage device, such that the backups can be restored in for use by the second version.

In an embodiment, the method can further include specifying a client device for which the one or more backup metadata records were generated, wherein receiving one or more backup metadata records further comprises receiving one or more backup metadata records that were generated for data backed up from the client device. The method can also include specifying a storage device where the one or more backup records can be found. In an embodiment, the method can also include specifying a backup server to which the storage device is communicatively coupled. Modifying the one or more metadata records to the second format can include changing a directory in the one or more metadata records to reference directory on the client for restoring application data from a backup that generated the one or more metadata records. Determining the format of backup metadata records can be performed using at least one application-specific plug-in module. Determining the format of backup metadata records can be performed by of: a backup utility or the specified application. Determining the format of backup metadata can be initiated at a specified time and date. In an embodiment, the method can also include specifying a directory on the storage device where the one or more backup metadata records having been generated in the first format can be found. FIG. 1 illustrates, in block diagram form, a backup system infrastructure 100 for use in backing up data from a client 200 to a storage device 260. The backup system infrastructure 100 can also be used to maintain backup data stored on backup storage 260. The backup system infrastructure 100 can include a remote administration device 110, a network 120, cloud storage 130, one or more client devices 200, a backup server 300, and one or more backup storage devices 260. Client 200 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, client 200 may be a primary storage system (e.g., local data center) that provides storage to other local clients, which may periodically back up the content stored therein to a backup storage system (e.g., a disaster recovery site or system), such as storage system 300. Network 120 may be any type of networks such as a local area network (LAN), a wide area network (WAN) such as the Internet, a fiber network, a storage network, or a combination thereof, wired or wireless.

A client 200 can be directly coupled to a backup storage 260, such as local USB drive, solid state storage, CD-ROM, CD-RW, DVD drive, or external hard drive. In addition, or alternatively, a backup storage 260 can be coupled to a backup server 300. The backup server 300 can be communicatively coupled to client device 200 via network 120. A client device 200 can be a single host computer. A client device 200 can also be one of a plurality of virtual machines on a host computer. See FIG. 2 and FIG. 14 for more detail about client device 200. Unless otherwise stated, client device 200 and virtual machine 250, will be used interchangeably for purposes of discussing the backing up of data and the administration and maintenance of backup data according to embodiments described herein.

Remote administration device 110 can be used to initiate a backup of client device 200 to backup storage 260. Alternatively, client device 200 can initiate its own backup. In another embodiment, backup server 300 can initiate a backup of client device 200, e.g. based upon a regular schedule or based upon a backup policy associated with the client device 200. In an embodiment, a person does not need to manually enter a command to initiate a backup of client device 200.

Backup server 300 can include a deduplication service to deduplicate data before writing backup data to backup storage 260. Backup server 300 can also store backup data, such as save sets or metadata records, on cloud storage 130. Backup server 300 can include one or more backup policies for a type of backup to be performed. Backup server 300 can also include a backup utility application software, including one or more application-specific modules for performing a backup. A backup can be initiated using a backup utility on the client device. In an embodiment, a backup can be initiated using a backup utility on the backup server or a backup utility on the remote administration device 110.

Client device 200 can include one or more applications. Applications can be backed up on a per-application basis. In an embodiment, client device 200 can be backed up using an image backup process.

Figure 2:
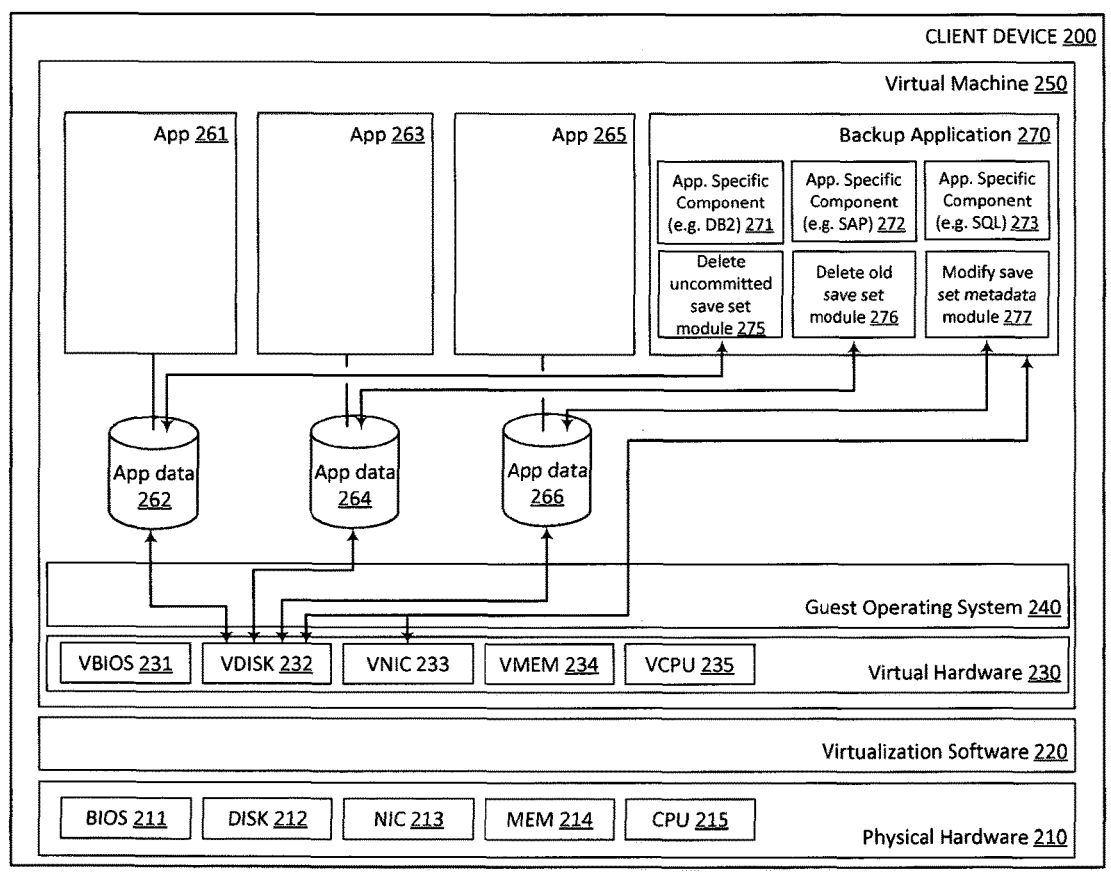
FIG. 2 illustrates, in block diagram form, a virtual machine on a client device having backup functionality, according to some embodiments.

FIG. 2 illustrates, in block diagram form, client device having a virtual machine 250, both of which can support backup functionality, according to some embodiments.

Although a virtual machine 250 is described as housing the applications that are being backed up to a backup storage device 260, it is to be understood that client device 200 can be a conventional computing system having only physical hardware 210, without virtualization software 220 or virtual hardware 230. Thus, backup application 270, applications 261, 263, and 265, and backup data 262, 264, and 266 can be implemented within client device 200, rather than by virtual machine 250.

Client device 200 hardware 210 can include a physical basic input-output system (BIOS) 211, one or more physical disks or storage objects 212, one or more network interface cards (NIC) 213, memory 215, and one or more processors or CPUs 215. Client device 200 can be implemented in accordance with the computing system described with reference to FIG. 14, below.

Client device 200 can include virtualization software 220 and virtual hardware 230 that can correspond to physical hardware 210, such as a virtual BIOS 231, one or more virtual storage devices (VDISK) 232, one or more virtual network interface cards (VNIC) 233, virtual memory 234, and one or more virtual processors 235. Client device 200 can also include one or more guest operating systems 240.

Continuing with the description of client device 200 as a virtual machine 250, client device 200 can include one or more virtual machines 250, each of which can have applications 261, 263, 265, and corresponding application data 262, 264, and 266, respectively. Backup utility 270 can include application-specific components 271, 272, and 273, e.g. for backing up DB2, SAP, and SQL data, respectively, and for performing or other application-specific backup functions. Backup utility 270 can also include backup utility modules, e.g. a module 275 for deleting uncommitted save sets, a module 276 for deleting old save sets, and a module 277 to modify metadata of previous backups. Additional application-specific and/or function-specific modules can be added to backup application 270.

Example applications 261, 263 and 265 can generate, and interact with, application data 262, 264, and 266 respectively. Backup application 270 application-specific components 271-273 can interact with respective application data 262, 264, 266 to backup and write files to virtual disk 232, or write files to virtual network interface card (vNIC) 233 for transmitting over hardware network interface card (NIC) 213 to network 120 and on to backup server 300 over network 120.

In one embodiment, client 200 further includes a storage manager or storage controller (not shown) configured to manage storage resources of client 200, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Figure 3:
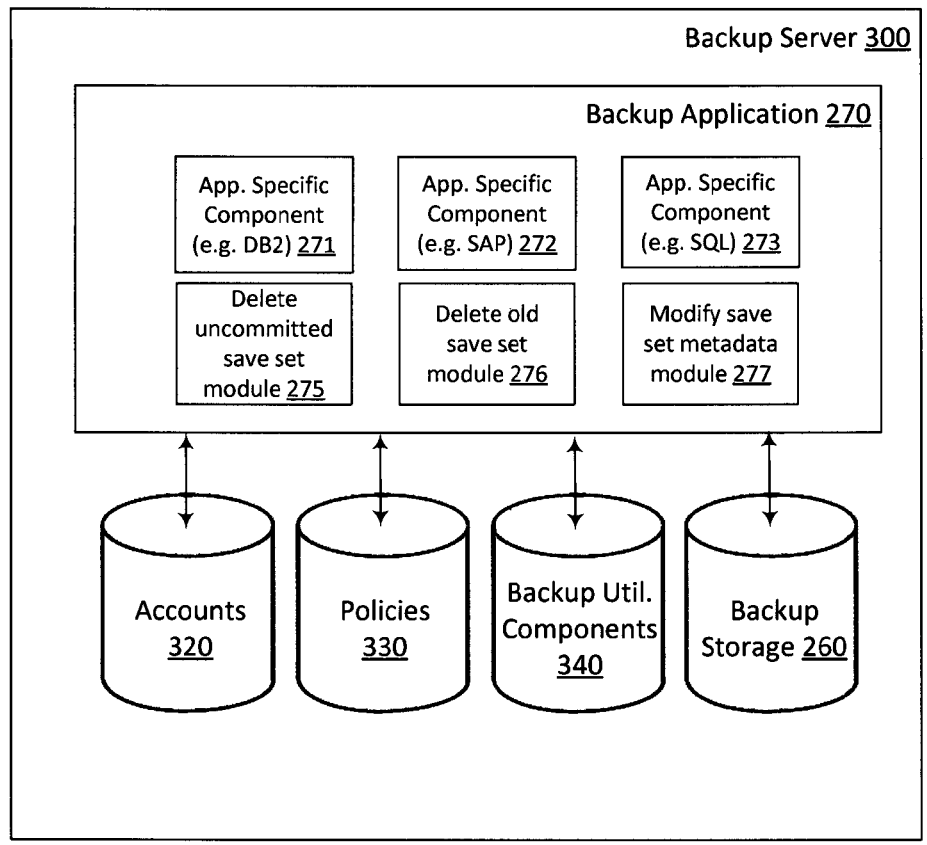
FIG. 3 illustrates, in block diagram form, a backup server having backup functionality, accordingly to some embodiments.

FIG. 3 illustrates, in block diagram form, a backup server 300 having a backup application 270, accordingly to some embodiments. In an embodiment, backup application 270 on backup server 300 can initiate a backup of data from client device 200, or virtual machine 250, to backup sever 300, then on to backup storage 260.

Backup application 270, can include one or more application-specific components 275-277 for performing backups of specific types of application data, such as DB2 (271), SAP (272) or SQL (273). Backup application 270 can also include one or more function-specific components, such as a module 275 to delete uncommitted save sets, a module 276 to delete old save sets, or a module 277 to modify save set metadata.

Backup application application-specific components, e.g. 271-273, and function-specific components, e.g. 275-277, can be stored within backup utility components storage 340 and deployed as-needed to a client device 200. In an embodiment, a client device 200 performing a backup of a particular application data type can request a module from backup server 300 for incorporation into backup utility 270 on client device 200. In an embodiment, client device 200 performing a particular backup utility function, e.g. delete uncommitted save sets, can request an appropriate function-specific backup utility module for incorporation into the backup utility 270 on the client device 200.

Client device 200 and/or virtual machine(s) 250 can be backed up in accordance with policies 330 associated with accounts 320. A user can have an account 320 that will permit the user to receive backup functionality from backup server 300. An account 320 can be associated with one or more policies 330. Policies 330 can determine when client data gets backed up, the type of storage 260 that is used to store the user's client data (e.g. cloud storage 130, tape, hard disk, et al.) Policies 330 can further determine how long backup data is stored, whether data is to be deduplicated before backup, and other features of a backup of client data. Backup policies 330 can also be used by client device 200 in backing up data to storage device 260 directly coupled to client device 200.

Backup server 300 operating as a storage system may include or represent any type of servers or a cluster of one or more servers (e.g., cloud servers). For example, storage system 300 may be a storage server used for various different purposes, such as to provide multiple users or client systems with access to shared data and/or to back up (or restore) data (e.g., mission critical data). Storage system 300 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 300 includes, but is not limited to, storage service engine, optional deduplication logic, and one or more storage units or devices communicatively coupled to each other (not shown). The storage service engine may represent any storage service related components configured or adapted to provide storage services (e.g., storage as a service) to a variety of clients using any of the access protocols set forth above. For example, the storage service engine may include or be coupled to backup application 310. Backup application 310 is configured to receive and back up data from a client (e.g., hosts 200) and to store the backup data in any one or more of the storage units. The backup application 310 may further include restoration functionality configured to retrieve and restore backup data from any one or more of the storage units back to a client (e.g., hosts 200).

The storage units may be implemented locally (e.g., single node operating environment) or remotely (e.g., multi-node operating environment) via interconnect, which may be a bus and/or a network (e.g., a storage network or a network similar to network). The storage units may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system.

In response to a data file to be stored in the storage units, according to one embodiment, deduplication logic (not shown) is configured to segment the data file into multiple segments (also referred to as chunks) according to a variety of segmentation policies or rules. The deduplication logic may choose not to store a segment in a storage unit if the segment has been previously stored in the storage unit. In the event that the deduplication logic chooses not to store the segment in the storage unit, it stores metadata enabling the reconstruction of the file using the previously stored segment. As a result, segments of data files are stored in a deduplicated manner, either within each of the storage units or across at least some of the storage units. The metadata, such as metadata, may be stored in at least some of the storage units, such that files can be accessed independent of another storage unit. Metadata of each storage unit includes enough information to provide access to the files it contains.

FIG. 4 illustrates, in block diagram form, data and metadata generated during a backup, and operations for generating and storing the data and metadata. A backup can include backup data, in the form or one or more save sets, each of which can contain one or more save files. Backup data 400 can also include one or more metadata records that can describe the save sets and save files. In an embodiment, a save set can be a container that stores the one or more save files. Alternatively, in a deduplicated backup storage system, a save set can be a container that stores deduplicated segments of one or more save files. In an embodiment, metadata can be stored in a database, e.g. SQLite.

In an embodiment, backup data 400 can be organized on a target storage device 260 in a hierarchical manner. For example, a target directory 402 for a backup can be specified on a storage device 260 such as, for example, "target=// storage_device/client_device." Storage device can refer to a name or identifier of the storage device 260. Client device can refer to a name or identifier of client device 200 that is the source of the data to be backed up. Backup data 400 can include backup storage 405 for save files, save sets, and temporary files such as one or more lock files. Backup data 400 can also include a metadata database 410 for storing metadata that describes backup data 400. In an embodiment, backup storage 405 and metadata database 410 can be stored on the same storage device 260.

In operation 416, before a first save set container is generated, a lock file can be written to an index directory for the first save set container. The lock file acts as a marker that a backup of a first save set has begun. When the backup of the first save set successfully completes, then the lock file can be deleted, indicating the successful backup of the first save set.

In operation 420, for the purpose of illustration, a first save set file "Saveset1" can be opened. In an embodiment, the save set file can be a container that can store one or more save sets. In an embodiment, a save set container can hold only one save file per save set. In another embodiment, a save set container can hold a plurality of save files of a save set. In an embodiment, the save set can be opened in a subdirectory of "target" that is specific to an application-specific component (e.g. "app_comp1") that is assisting in performing the backup of the application data. In an embodiment, a subdirectory of the application specific component can also be specified, e.g. /dirs. The subdirectory can be made of up a top level directory name on client device 200 and, optionally, a subdirectory name of the top level directory on the client device 200. In an embodiment, save files can use the filename extension, such as ".SS". In an embodiment, a save set filename can have a date/time stamp as a part of the filename. In the example of operation 420, the first save set can have a directory and filename of "target/app_comp1/dir/Saveset1.SS."

Also in operation 420, a metadata record that describes the first save set can be written to metadata database 410. In an embodiment, the metadata record can be an SQLite database record stored with filename, e.g. "target/app_comp1/dir/index/Saveset1.REC." In an embodiment, the metadata record can follow the same filename format as the corresponding save set. In an embodiment, the save set metadata record can have the filename extension ".REC". The save set metadata record can include descriptive information about the save set such as save set filename, file size, save set file type, storage format, date/time creation, client device, storage name, and the like.

In operation 425, backup utility 270 can generate and store a first save file to the first save set. The first save file can store a particular file from the source client device. In an embodiment, the first save file can store data blocks of one or more files. In an embodiment, a first save file can have a naming scheme that follows the save set filename. In an embodiment, the first save file can have a predetermined file extension such as ".SF". A data format of the first save file can be determined by the application-specific ("app_comp1") backup utility component that generated the save file. An example filename the first save file in the first save set can be "target/app_comp1/dir/Savefile1.SF".

Also in operation 425, a metadata record can be generated that describes the first save file. For example, metadata describing the save file could include an identifier of the application component that generated the save file, a date/time stamp of the save file, or a size of the save file. The save file metadata record can also include a pointer, or other reference, to the save set that contains the save file. In an embodiment, the reference to the save file within the metadata record can also include an offset, or other reference within the save set, to the save file for which this metadata record is generated. As such, the metadata record can act as an index to the save set that contains the save file. The metadata record can have a file extension ".NDX" or ".REC", indicating that it is an index record to a save file within a save set.

In an embodiment, index metadata records can be merged into a single database to form a "rootindex" of all save files in all save sets on a storage device 260 for a particular client device. During a restore process, a restore utility can request a save file filename to restore, from a user, and lookup the save file filename directly within the metadata database, or within the rootindex, to determine which save set contains the save file to restore, as opposed to searching all save sets looking for a particular save file to restore.

In operation 430, a second save file can be added to the first save set using the application specific component "app_comp1" in the same manner as in operation 425. A metadata record can be generated and stored in the metadata database 410 for the second save file, in the same manner as in operation 425.

In operation 435, if there are no more save files to add to the first save set, then the first save set can be closed and written to storage device 260.

In operation 436, after the first save set has been written to storage 260, the lock file that was generated for the first save set in operation 416 can be deleted. Deletion of the lock file for a save set is an indication that the backup of the save set has been successfully completed.

In operation 440, before a second save set container is generated, a lock file can be written to an index directory for the second save set container. The lock file acts as a marker that a backup of the second save set has begun. When the backup of the second save set successfully completes, then the lock file can be deleted, indicating the successful backup of the second save set.

In operation 441, a second save set can be opened for receiving save files generated by backup utility 270 using application-specific component "app_comp2". A metadata record describing the second save set can be generated and stored in the metadata database 410 in the same manner as described for the first save set file in operation 420.

In operations 445 and 450 a third and fourth save file, respectively, can be generated by backup utility 270 using second application-specific component "app_comp2" and stored into the second save set file. The third and fourth save files can be generated and saved to the second save set in accordance with the operations 425 and 430, above, for the first and second save files and first save set. A metadata record corresponding to each of the third and fourth save files can be generated in accordance with operations 425 and 430 above. The metadata records corresponding to the third and fourth save files each contain a pointer or other reference to their respective third and fourth save files within the second save set.

In operation 455, if there are no more save files to add to the second save set, then the second save set can be closed and written to storage device 260.

In operation 456, after the second save set has been written to storage 260, the lock file that was generated for the second save set in operation 440 can be deleted. Deletion of the lock file for a save set is an indication that the backup of the save set has been successfully completed.

Fewer, or more, save sets and/or save files can be stored in a variety data formats using the backup utility 270 alone, or in conjunction with an application specific component for a particular application data type.

Figure 11:
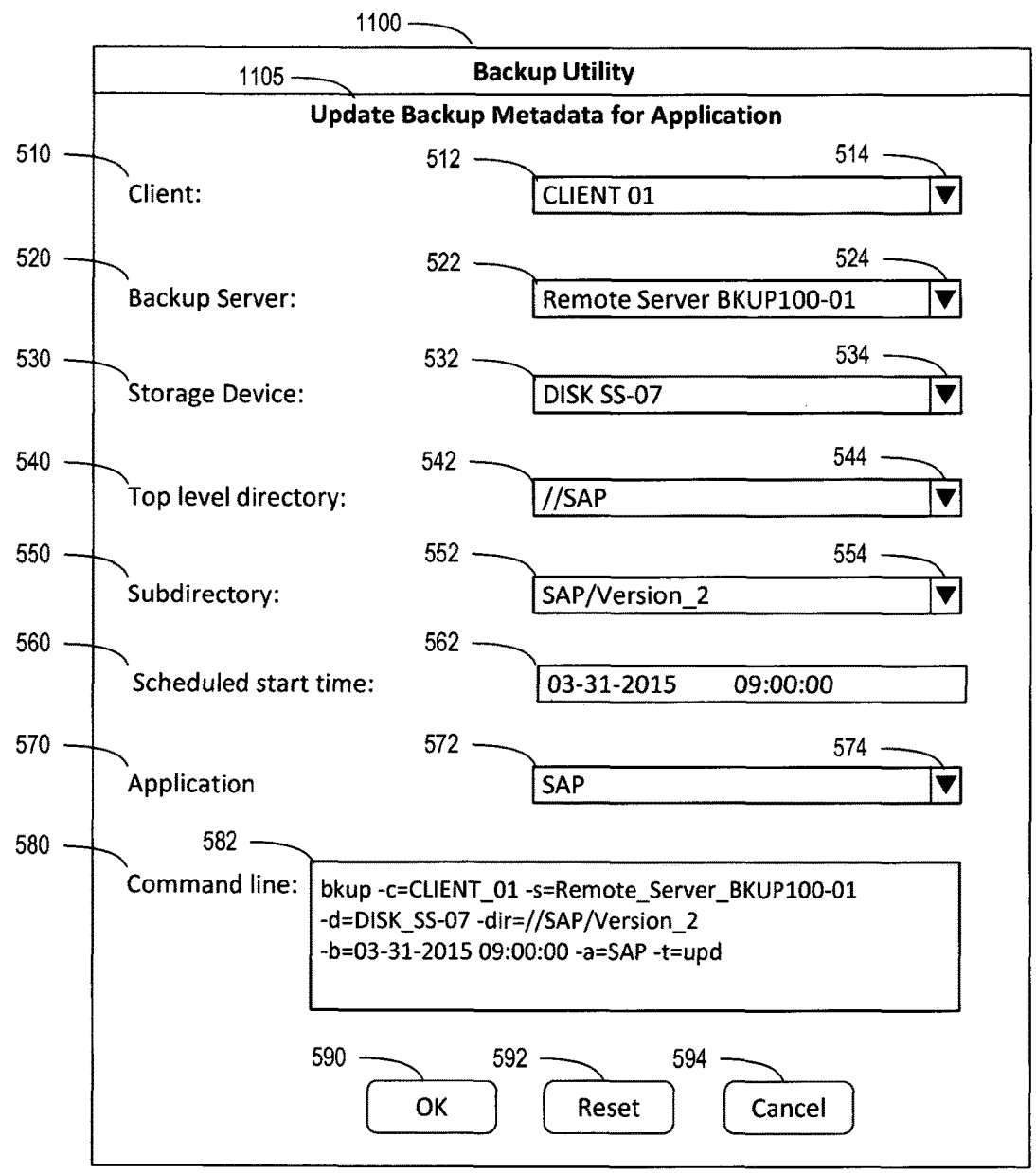
FIG. 11 illustrates, in block form, GUI of a backup utility application for updating metadata of a backup generated by a previous version of an application, to a metadata format for a new version of the application, according to some embodiments.
Figure 12:
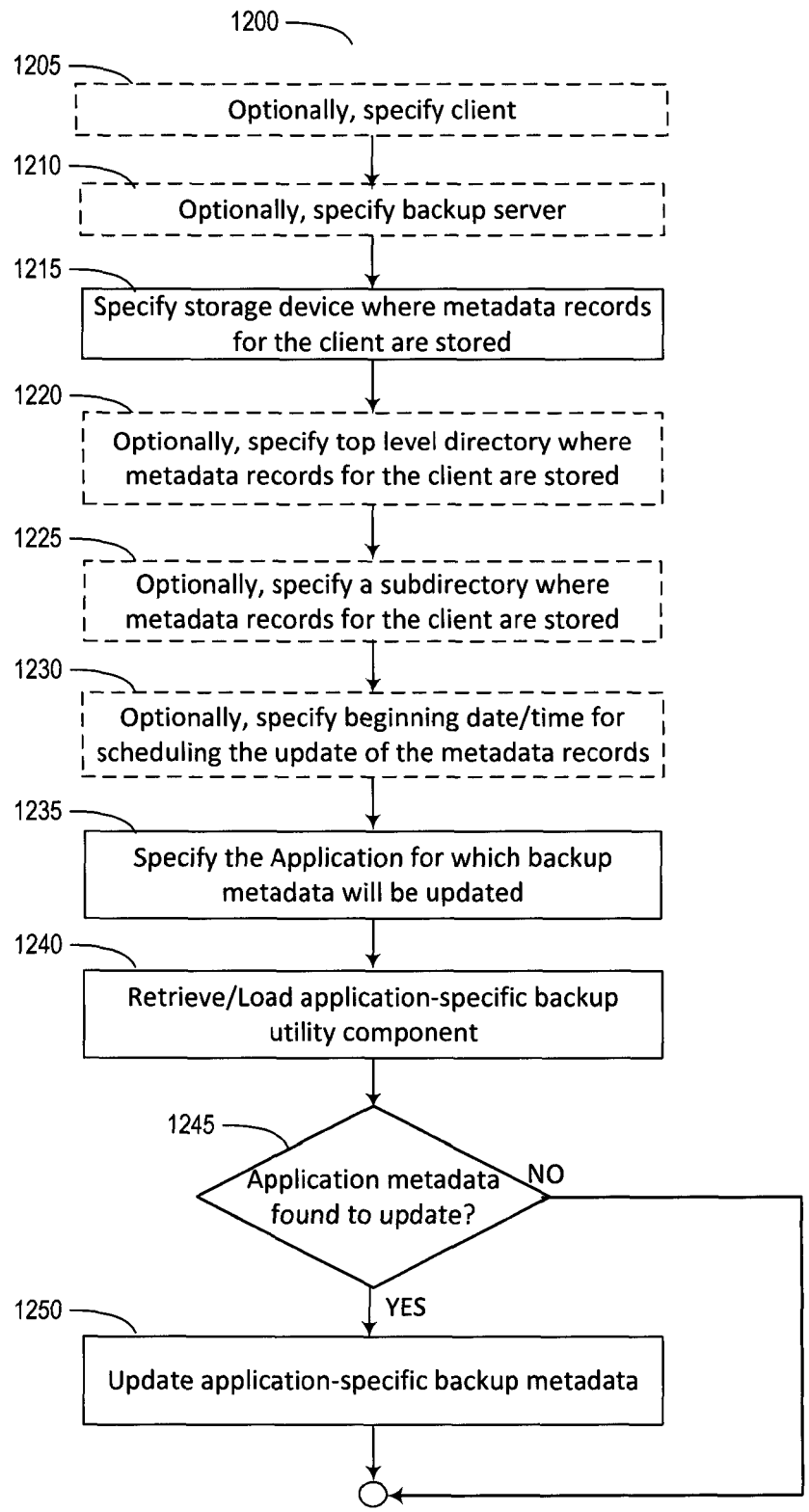
FIG. 12 illustrates, in block form, a method of updating metadata of a backup generated by a previous version of an application to a metadata form for a new version of the application, according to some embodiments.

As will be described more fully below, with respect to FIG. 11 and FIG. 12, the metadata that is generated in relation to a save file and/or save set contains some very specific references to directories, data formats, and other information that may be application specific. This information may change if, for example, an application gets updated. A common update/backup scenario is that before a user updates an application software, the user backups the application data. Then the user updates the application software. Sometimes the application will specify a new directory or new data format for application data. The new directory and/or new application data format may affect whether or not existing backups for the application data can be used at all, due to the changes in directory and/or data format. In FIG. 11 and FIG. 12, below, a process for updating metadata for existing backups is described that can alter the metadata generated here in the operations of FIG. 4. Updating the metadata for existing backups can render existing backups usable with an updated application.

Figure 5:
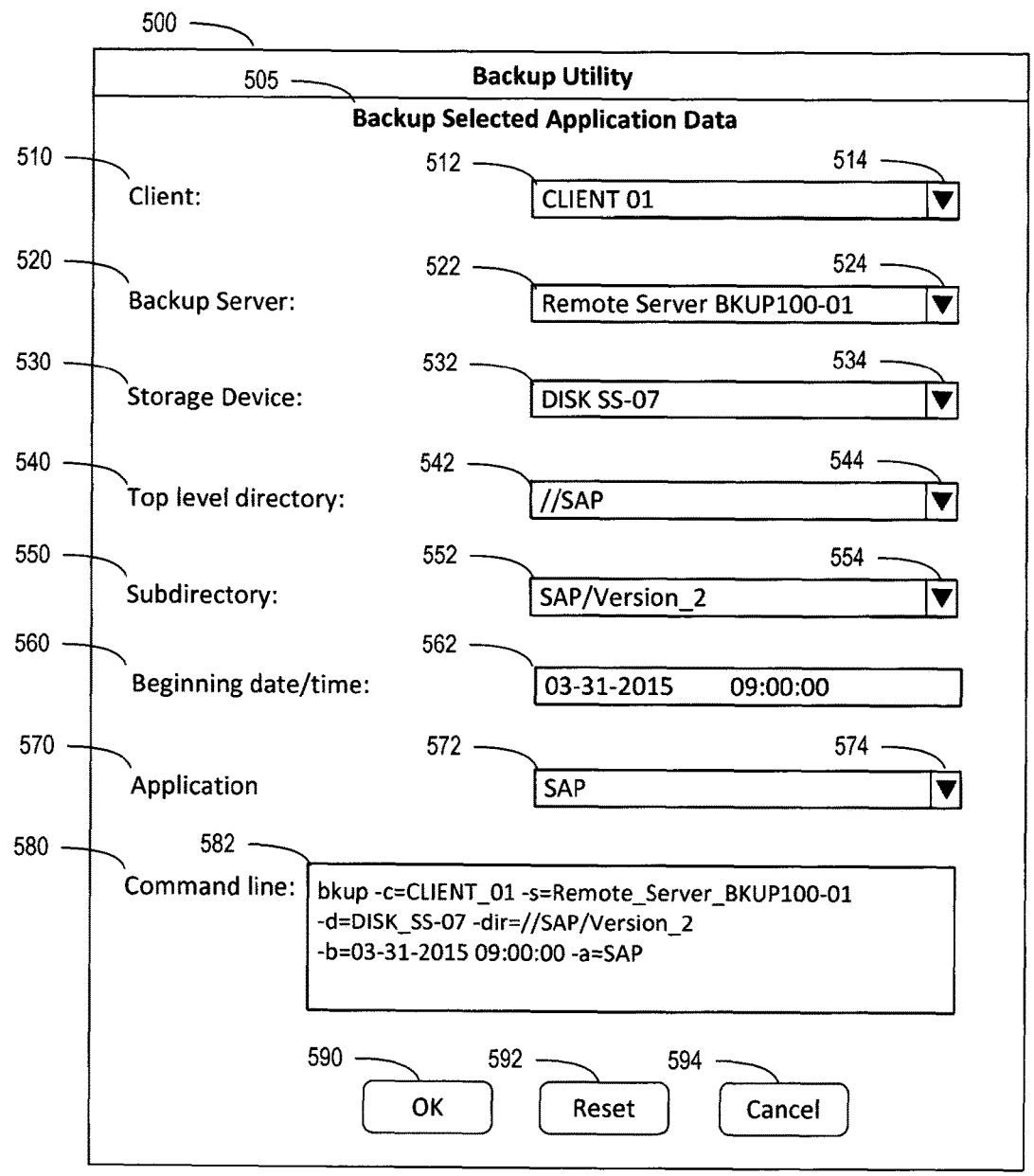
FIG. 5 illustrates, in block diagram form, a graphical user interface (GUI) of a backup utility application for backing up selected application data from a client device to a storage device.

FIG. 5 illustrates, in block diagram form, a graphical user interface (GUI) 500 of a backup utility application 270 for backing up selected application data from a client device 200 to a storage device 260. GUI 500 can be used to back up data on a client device 200, or a virtual machine 250 (interchangeably, "client device 200").

In an embodiment, GUI 500 have can include a field 510 for specifying a client device 512. If the backup utility 270 is being initiated on a particular client device 512, then client device field 512 can default to the particular client device 512, e.g. "CLIENT 01." In such case, drop down arrow 514 may not be shown or may be an inactive control. If the backup utility 270 is being initiated from a remote administration device 110, the drop down box 514 may populate with a list of client devices 512 to select from for backup. If the backup utility 270 is being initiated from remote administration device 110, then drop down box 514 may populate with a list of client devices 512 that the particular administrator is authorized to perform backups for.

In field 520, a target backup server 522 may be selected. A drop down arrow 524 may display a list of available servers to which the client device 512 may be backed up. In an embodiment, a default backup server selection can be "no server (direct attached storage)" meaning that the backup data will be stored on a storage device 532 that is coupled to client device 512. In an embodiment, a backup server 522 selection can include "Cloud Storage." If cloud storage 130 is selected, a pop-up screen may prompt the user for an account login credential to use cloud storage 130. If a client device 512 is not currently connected to a network 120, or if no backup server 522 is found that the client device 512 is authorized to use, then the drop down arrow 524 may be disabled or not shown, and "no server (direct attached storage)" may be shown.

In field 530, a storage device 532 can be selected. If, in backup server field 522, "no server (direct attached storage)" is displayed, then in field 532, drop down arrow 534 can display a list of storage devices 532 that are coupled to client device 512 from which a selection can be made. If, in backup server field 522, a backup server was selected, then in storage device field 532 a list of storage devices that are available to the selected backup server 522 can be displayed in response to selecting drop down arrow 534.

In field 540, a top level directory on client device 512 can be selected that specifies where backup utility 270 can find the data to be backed up. In an embodiment, drop down arrow 544 can display a list of top level directories where application data resides on the client device 512. In an embodiment, top level directories where application data resides can be determined by the client device 512 performing a scan of one or more storage devices having application data. In an embodiment, backup utility 270 can include an application-specific module that is programmed with possible directories where to find application data for the specific application on client device 512. In an embodiment, drop down arrow 544 can generate a list of top level directories from which the user has previously performed one or more backups. In an embodiment, drop down arrow 544 can be replaced, or supplemented, with a "Browse" button that allows a user to navigate to a directory where the data to be backed up can be found.

In field 550, a subdirectory of the top level directory can be specified that identifies where data to be backed up may be found on the client device 512. In an embodiment, Drop down arrow 554 can activate a populated list of subdirectories of top level directory 542. In an embodiment, an application-specific backup component of backup utility 270 can display only subdirectories of top level directory 542 which contain the type(s) of data that are consistent with, and supported by, the application-specific backup component, e.g. subdirectories containing SAP files. In an embodiment, drop down arrow 554 can populate a list of subdirectories that are deeper than immediate sub-directories of top level directory 542. For example, drop down arrow 554 may activate a list of all subdirectories of top level directory 544, at any depth, that contain DB2 data.

In field 570, an application-specific selection can be made that limits the type of data to be backed up, e.g. SQL data, SAP data, DB2 data, or Exchange Server data. In an embodiment, drop down arrow 574 can populate a list of applications that are available on client machine 512. In an embodiment, drop down arrow 574 can populate a list of applications for which a backup policy 330 is stored on backup server 522 in relation to the client device listed in field 512. In an embodiment, drop down arrow 574 can populate a list of applications for which the client device 512 has previously had backups performed.

In field 580, a text equivalent of a backup command can be generated from the fields of the GUI 500. For example, backup utility "bkup" can perform a backup for client device "-c=CLIENT_01" to backup server "-s=Remote_Server_BKUP100-01" on storage device "-d=DISK_SS-07" of top level directory and subdirectory "-dir=//SAP/Version_2" beginning at date/time "-b=03-31-2015 09:00:00" for application "-s=SAP." In an embodiment, the generated command 580 can be edited. In an embodiment, edits to the generated command 580 can be reflected in the corresponding fields of the GUI. In an embodiment, edits to the generated command 580 can override the selections in fields 510-572. In an embodiment, edits to the generated command 580 can be limited by a user's privilege set to edit generated commands, or edit any particular field or values of a field 510-572, above.

A user can then select the OK button 590 to execute a backup in accordance with the fields of the GUI 500, or select the Reset button 592 to reset the fields of the GUI 500, or select Cancel 594 to exit backup utility. Selecting OK 590 can cause a backup to be performed in accordance with FIG. 6A and FIG. 6B, below. In an embodiment, selecting the Reset button 592 can cause the fields of the GUI 500 to reset to default values for the backup utility 270. In an embodiment, selecting the Reset button 592 can cause the fields of the GUI 500 to reset to default values for the client device 512. For example, the client device 512 may not be attached to a network 120 and may have only one storage device 532 directly attached to the client device 512. In such case, selecting Reset 592 may cause field 512 to display the client's name, field 522 may display "no server attached," and field 532 may display the name of the attached storage device 532. In an embodiment, selecting the Reset button 592 can cause the fields of the GUI 500 to reset to default values for a policy 330 associated with the client device 512. In such case, on selecting Reset 592 one or more of Drop down lists 512-572 may be populated with values obtained from the policy 330.

Figure 6A:
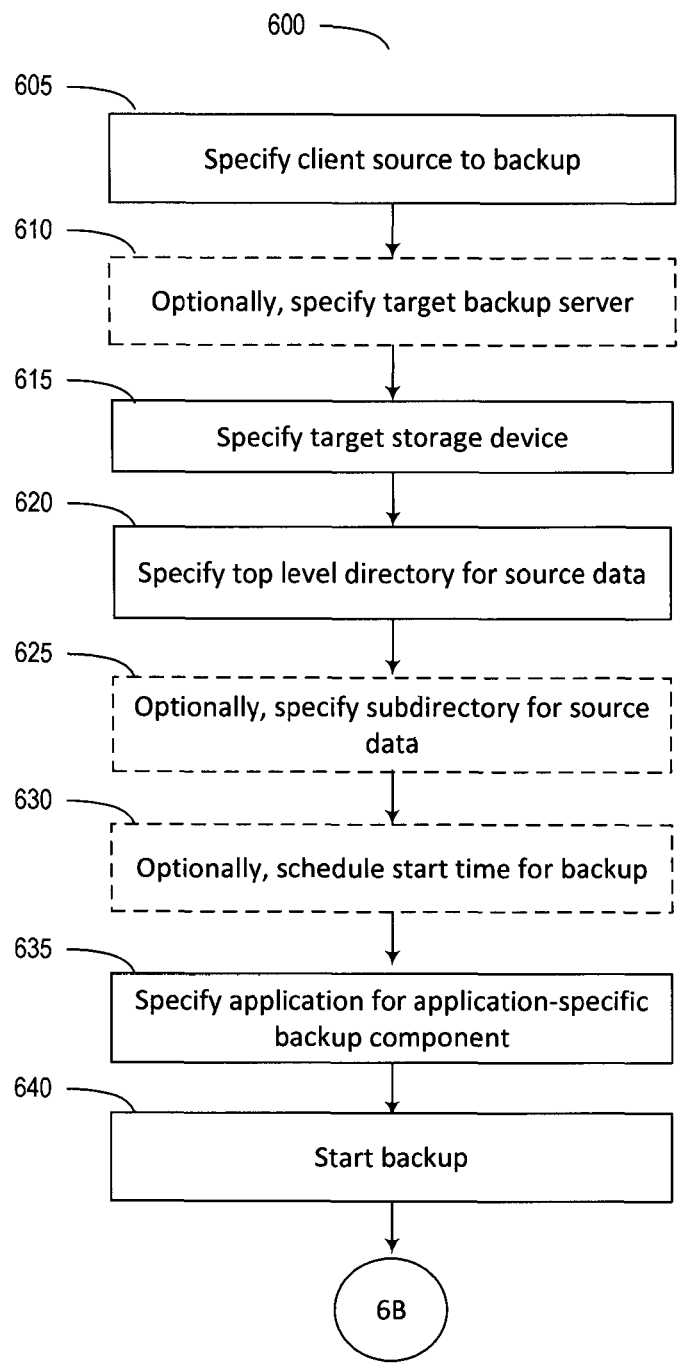
FIGS. 6A and 6B illustrate, in block diagram form, a flow chart of a method of backing up data from a client device to a storage device according to some embodiments.
Figure 6B:
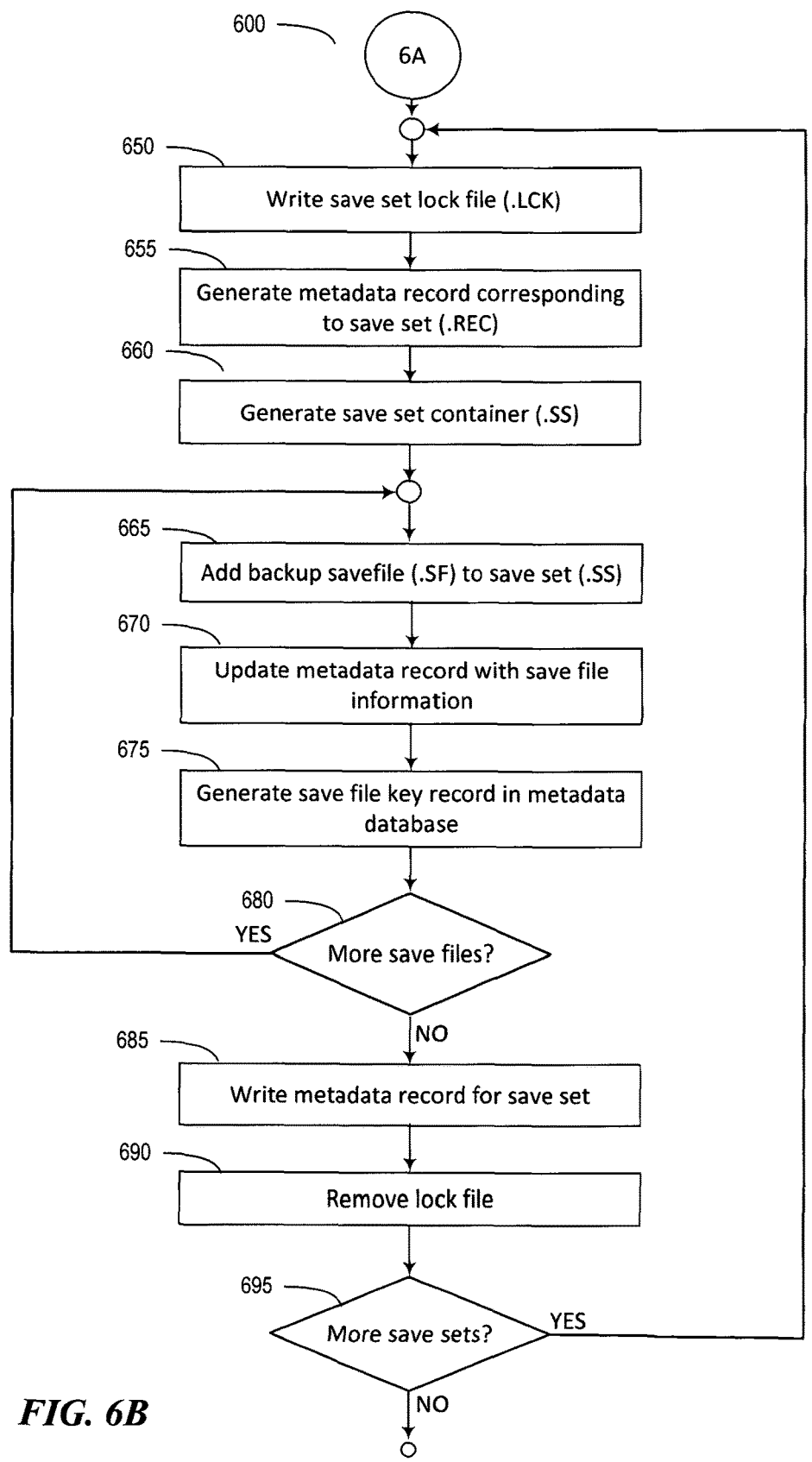

FIGS. 6A and 6B illustrate, in block diagram form, a flow chart of a method 600 of backing up data from a client device 512 to a storage device 532 according to some embodiments. Parameters values for performing method 600 have been described above, with reference to graphical user interface (GUI) 500 in FIG. 5. Process 600 may be performed by processing logic that includes hardware (e.g. circuitry, dedicated logic, etc.), software (e.g., embodied on a non-transitory computer readable medium), or a combination thereof. For example, process 600 may be performed by any of the systems as shown in FIGS. 2-3.

In operation 605, a client device 512 can be specified for the backup. The client device 200 can store data for an application that is to be backed up by this method 600.

In operation 610, a target backup server 522 can optionally be specified that will receive and store the backup data to a storage device 532. If a backup server 522 is not specified, or is not available, then a direct-attached storage device 532 can be specified in operation 615.

In operation 615, a storage device 532 can be specified on which the backup will be stored. Storage device 532 can be directly attached to client device 512. In an embodiment, client device 512 can be coupled to a backup server 522, optionally specified in operation 610, and storage device 532 can be coupled to the backup server 512.

In operation 620, a top level directory on the client device 512 can be specified. The top level directory can indicate where, on the client device 512, the data to be backed up may be found.

In operation 625, a subdirectory of the top level directory can optionally be specified. The subdirectory can indicate where, on the client device 512, the data to be backed up may be found.

In operation 630, a scheduled staring date/time can optionally be specified that indicates when the backup method 600 is to begin.

In operation 635, a type of application that generated the data to be backed up can be specified. The type of application can cause the client device 512, or backup server 522, to load and execute an application-specific module, e.g. 271-273, that is configured to back up data for a particular application. An application-specific module can determine whether data is to be backed up one file at a time, or as blocks of data, or other application-specific backup format. Application-specific modules can be stored on a backup server 300 and can be deployed on request to client device 512.

In operation 640, the backup process can begin. In an embodiment, operation 640 can schedule the start of the backup at the optionally specified start time for the backup, specified in operation 630.

In operation 650, method 600 can generate a lock file on storage device 532 to indicate that the backup of a save set has begun. In an embodiment, the lock file filename can include the date/time stamp at the time starting the backup with the extension ".LCK" as shown in reference to FIG. 4, elements 416 and 440.

In operation 655, a metadata record can be generated for a save set container, as shown in reference to FIG. 4, elements 420 and 441. In an embodiment, the metadata record can have the same filename as the lock file, except with the ".REC" extension. In an embodiment, the metadata record can be stored in a metadata database. In an embodiment, the database can be an SQLite database.

In operation 660, shown in FIG. 6B, a save set container can be generated on storage device 532 to receive and store one or more save set files of the backup. In an embodiment, if this is the first save set file in the backup, then the save set filename can be incremented above the filename of the backup metadata record filename. If this is not the first save set file in the backup, then in an embodiment, the save set filename can be incremented above the immediately previous save set filename. In an embodiment, the filename of the save set can have the file extension ".SS".

In operation 665, backup utility 270 can generate a backup save file containing backup data from the client device 512. The save file can include the date/time stamp in the filename. In an embodiment, the save file can have the filename extension ".SF". In an embodiment, the save file can be stored in the save set container generated in operation 655, above.

In operation 670, backup utility 270 can generate a metadata record corresponding with the save file stored in operation 665. In an embodiment, the metadata record can be stored in a metadata database. In an embodiment, the database can be SQLite.

In operation 675, one or more additional metadata records can be generated for the save files contained within the save set. Additional metadata records can a directory of keys. In an embodiment, a key can be a fully qualified pathname to a particular save file within a save set.

In operation 680, it can be determined whether there are more save files to store in this save set. If so, then the method can resume at operation 665. If there are no more save files to add to this save set, then the method 600 can continue at operation 685.

In operation 685, a metadata record for the save set can be stored. In an embodiment, the metadata record(s) can be stored in a metadata database. In an embodiment, the database type can be SQLite. In an embodiment, the filename of the metadata record for the save set can be the same as the filename of the corresponding save set. In an embodiment, the metadata record filename can have the file extension ".REC".

In operation 690, the lock file generated in operation 655 for the save set container can be removed from the storage device 532.

In operation 690, it can be determined whether there are more save sets to add to the backup. If so, then the method resumes at operation 655. If there are no more save sets to add to the backup, then the method ends at operation 695.

Figure 7:
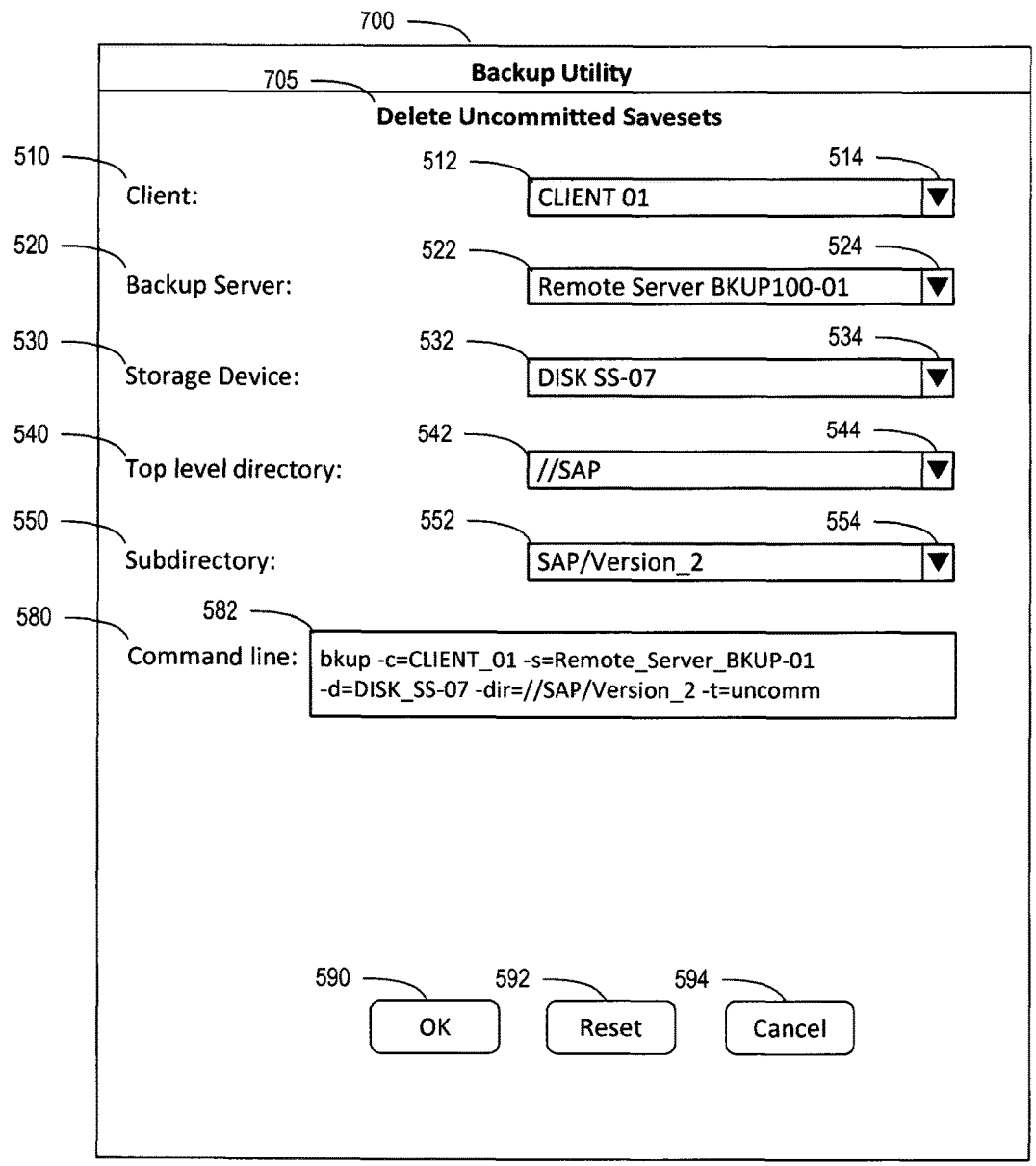
FIG. 7 illustrates, in block diagram form, a GUI of a backup utility application for deleting uncommitted save sets of an incomplete backup, according to some embodiments.

FIG. 7 illustrates, in block diagram form, a graphical user interface (GUI) 700 of a backup utility application 270 for deleting uncommitted save sets 704 of an incomplete backup, according to some embodiments. GUI 700 can be used to generate parameters for a command to delete uncommitted save sets generated during a backup of data of a client device 200, or a virtual machine 250 (interchangeably, "client device 512"). Uncommitted save sets can remain on a backup storage device 532 when a backup fails to successfully complete. A backup may fail to successfully complete for any number of reasons, including a power failure at the client device 512, a power failure at the backup server 522 or at the backup storage device 532, a failure of a network 120 that couples the client device 512 to the backup storage device 532, one or more cabling failures, or a hardware failure such as a failed hard disk.

In an embodiment, GUI 700 have can include a field 510 for specifying a client device 512 that may have generated an uncommitted save set. Specifying a client device 512 can ensure that only save sets generated by the client device 512 can be deleted by the backup utility 270. For example, a backup server 522 may contain backup data for a plurality of client devices. If the storage device 532 is attached to a backup server 522, then specifying a client device 512 can ensure that only save sets generated by this client device 512 will be affected on the storage device 532 of the backup server 522. Further, a backup policy 330 or account 320 associated with this client device 512 can enforce a rule that the client device 512 only has permission to delete uncommitted save sets that were generated by this client device 512. If the backup utility 270 is being initiated on a particular client device 512, then client device field 512 can default to the particular client device 512, e.g. "CLIENT 01." In such case, drop down arrow 514 may not be shown or may be an inactive control. If the backup utility 270 is being initiated from a remote administration device 110, the drop down arrow 514 may populate with a list of client devices 512 to select from for deleting of uncommitted save sets. If the backup utility 270 is being initiated from remote administration device 110, then drop down box 514 may populate with a list of client devices 512 for which the particular administrator is authorized to delete uncommitted save sets.

In field 520, a target backup server 522 may be selected. A drop down arrow 524 may display a drop down list 522 of available servers to which the client device 512 is coupled. In an embodiment, the drop down list 524 may only include backup server 522 that the client device 512 is permitted to delete uncommitted save sets upon. In an embodiment, a default backup server selection 522 can be "no server (direct attached storage)" meaning that the backup utility 270 will search for uncommitted save sets on a storage device 532 that is directly coupled to client device 512. In an embodiment, a backup server 522 selection can include "Cloud Storage." If cloud storage 130 is selected, a pop-up screen may prompt the user for an account log in credential. If a client device 512 is not currently connected to a network 120, or if no backup server 522 is found that the client device 512 is authorized to use, then the drop down arrow 524 may be disabled or not shown, and the backup server value 522 may show "no server (direct attached storage)."

In field 530, a storage device 532 may be selected. If, in backup server field 522, "no server (direct attached storage)" is displayed, then in field 532, drop down arrow 534 may display a drop down list 532 of storage devices 532 that are directly coupled to client device 512. If, in backup server field 522, a backup server was selected, then in storage device field 532 a drop down list 532 of storage devices that are available to the selected backup server 522 may be displayed in response to selecting drop down arrow 534.

In field 540, a top level directory on client device 512 can be selected that specifies where backup utility 270 is to find and delete uncommitted save sets. In an embodiment, drop down arrow 544 can display a drop down list 542 of top level directories where uncommitted save sets may be found on the selected storage device 532. Top level directories where uncommitted save sets may be found can be determined by the client device 512 performing a scan of the storage device specified in field 532, above. In an embodiment, drop down arrow 544 can generate a list of top level directories from which client device 512 has previously performed one or more backups on the selected storage device 532. In an embodiment, drop down arrow 544 can be replaced, or supplemented, with a "Browse" button that allows a user to navigate to a directory where the uncommitted save sets are to be searched found and deleted.

In field 550, a subdirectory of the top level directory can be specified that identifies where uncommitted save sets may be found on the selected storage device 532. In an embodiment, drop down arrow 554 can populate a list 552 of subdirectories of top level directory 542. In an embodiment, drop down arrow 554 can populate a list of subdirectories that are deeper than immediate sub-directories of top level directory 542. For example, drop down arrow 554 may activate a list of all subdirectories, at any depth, of top level directory 542 that the client device 512 has previously performed a backup to, and thus may have uncommitted save sets.

In field 580, a text equivalent of a command to delete uncommitted save sets can be generated from the fields of the GUI 700. For example, backup utility "bkup" can perform a delete uncommitted save sets function "-t=uncomm" for client device "-c=CLIENT_01" at backup server "-s=Remote_Server_BKUP100-01" on storage device "-d=DISK_SS-07" of top level directory and subdirectory "-dir=//SAP/Version_2." In an embodiment, a user can edit the generated command 580. In an embodiment, edits to the generated command 580 can be reflected in the corresponding fields of the GUI 700. In an embodiment, edits to the generated command 580 can be reflected in the corresponding fields of the GUI 700. In an embodiment, edits to the generated command 580 can override the selections in fields 510-572. In an embodiment, edits to the generated command 580 can be limited by a user's privilege set to edit generated commands, or edit any particular field or values of a field 510-572, above.

A user can then select the OK button 590 to delete uncommitted save sets in accordance with the fields of the GUI 700, or select the Reset button 592 to reset the fields of the GUI 700, or select Cancel 594 to exit the backup utility. Selecting OK 590 can cause the backup utility to delete uncommitted save sets in accordance with the method described below with reference to FIG. 8A and FIG. 8B. Alternatively, the GUI as shown in FIG. 7 can be utilized to identify the uncommitted save sets in the system. In one embodiment, a user can specify a directory and in response, the system may scan the specified directory and/or its subdirectories to identify one or more uncommitted save sets. The system can scan the specified director(ies) to locate any file with a particular extension such as "lck" and generate a list of uncommitted save sets to be displayed in the GUI. The user can then select some of all of the uncommitted save sets to be removed. In response to the user selection of one or more uncommitted save sets, the system then removes the selected save sets accordingly. In an embodiment, selecting the Reset button 592 can cause the fields of the GUI 700 to reset to default values for the backup utility. In an embodiment, selecting the Reset button 592 can cause the fields of the GUI 700 to reset to default values for the client device 512. For example, the client device 512 may not be attached to a network 120 and may have only one storage device 532 directly attached to the client device 512. In such case, selecting Reset may cause field 510 to display the client's name, field 520 may display "no server attached," and field 530 may display the name of the attached storage device 532. In an embodiment, selecting the Reset button 592 can cause the fields of the GUI 700 to reset to default values for a policy associated with the client device 512. In such case, drop down lists may be populated with values obtained from the policy.

Figure 8A:
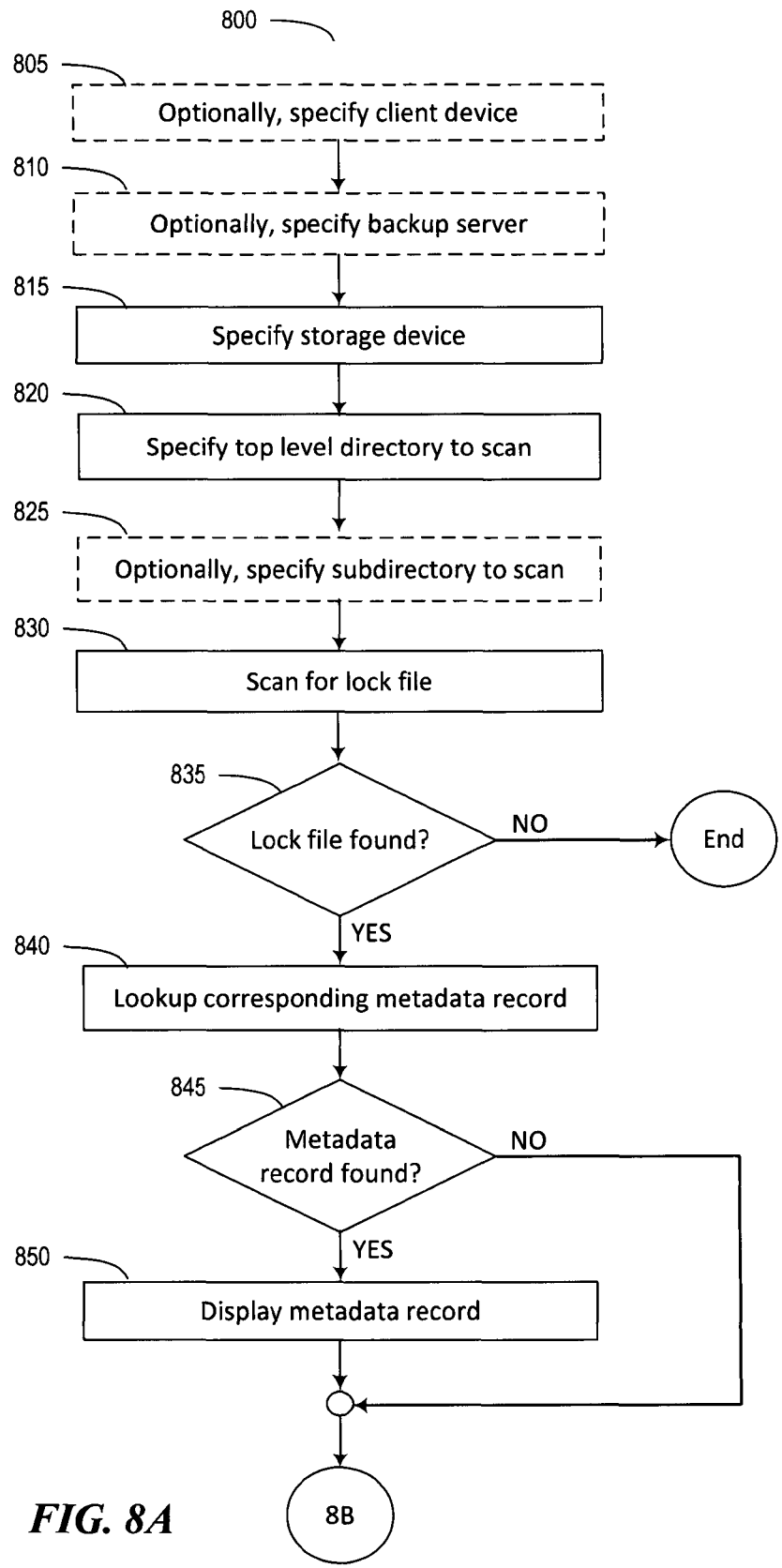
FIGS. 8A and 8B illustrate, in block diagram form, a method of deleting uncommitted save sets of an incomplete backup, according to some embodiments.
Figure 8B:
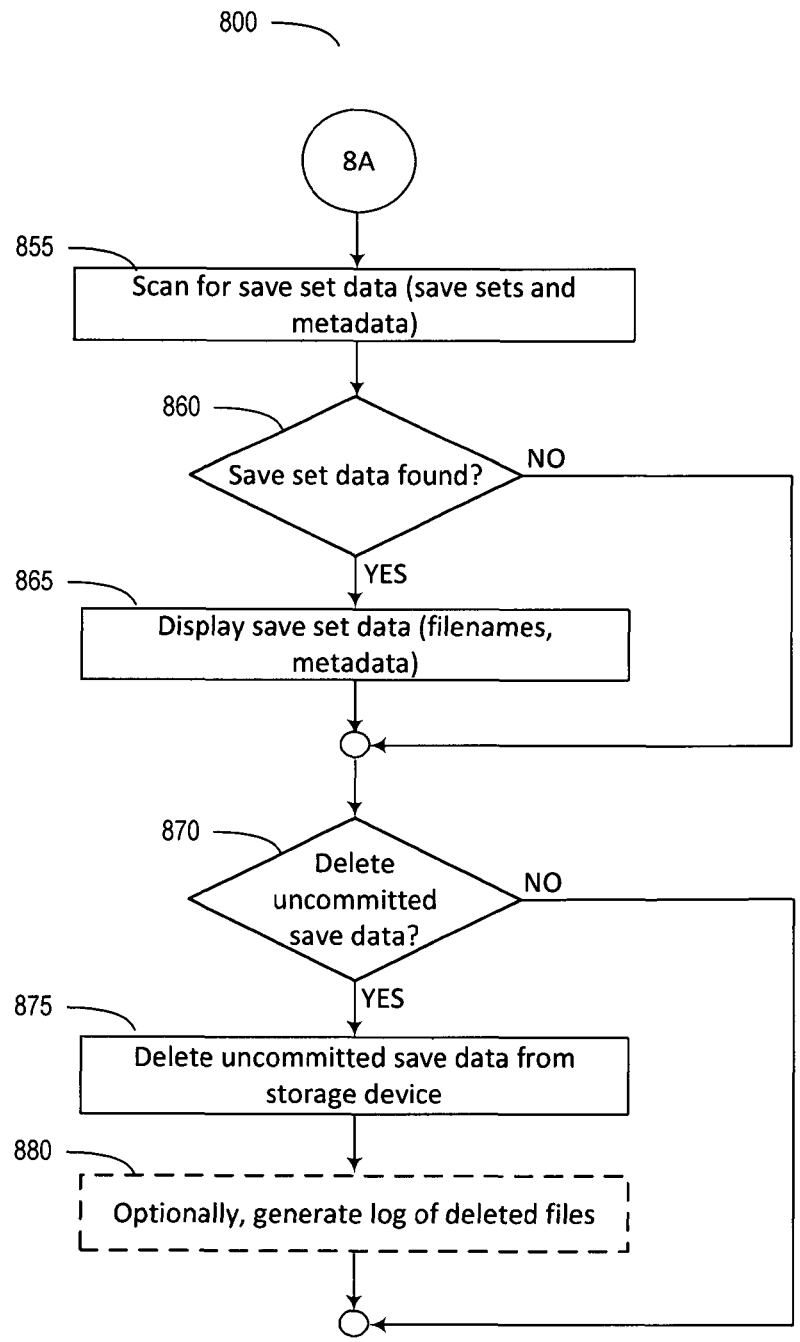

FIGS. 8A and 8B illustrate, in block diagram form, a method 800 of deleting uncommitted save sets of an incomplete backup, according to some embodiments. Parameters for a command to delete uncommitted save sets can be generated using graphic user interface (GUI) 700 of FIG. 7, above. Process 800 may be performed by processing logic that includes hardware (e.g. circuitry, dedicated logic, etc.), software (e.g., embodied on a non-transitory computer readable medium), or a combination thereof. For example, process 800 may be performed by any of the systems as shown in FIGS. 2-3.

In operation 805, a client device 512 can optionally be specified for which uncommitted save sets are to be deleted. If the uncommitted save sets to be deleted are located on a storage device 532 that is directly attached to the client device 512 that is deleting the uncommitted save sets, then the client device 512 need not be specified. In an embodiment, the if the uncommitted save sets to be deleted are located on a storage device 532 that is directly attached to the client device 512 that is deleting the uncommitted save sets, then the client device 512 can default to the client device to which the storage device 532 is directly attached. If the uncommitted save sets are located on a storage device 532 coupled to a backup server 522, then in some embodiments, the client device 512 can be specified to ensure only uncommitted save sets associated with this client device 512 are deleted from storage device 532 coupled to backup server 522. If the method 800 is being requested from an remote administration device 110, then the remote administrator may be required to specify a client device 512 and only uncommitted save sets associated with the client device 512 will be deleted.

In operation 810, a target backup server 522 can optionally be specified that has a storage device 532 that may have one or more uncommitted save sets stored thereon. If a backup server 522 is not specified, or is not available, then a direct-attached storage device 532 can be specified in operation 815.

In operation 815, a storage device 532 can be specified on which the uncommitted save sets will be found and deleted. Storage device 532 can be directly attached to client device 512. In an embodiment, client device 512 can be coupled to a backup server 522, optionally specified in operation 810, and storage device 532 can be coupled to the backup server 522.

In operation 820, a top level directory 542 on the storage device 532 can be specified where the uncommitted save sets may be found. In operation 825, a subdirectory 552 of the top level directory 542 can optionally be specified. The subdirectory 552 can indicate where, on the storage device 532, the uncommitted save sets may be found. In operation 830, a scan of the storage device 532 for uncommitted save sets can begin. In operation 835, it is determined whether an uncommitted save set lock file has been found. If not, then in one embodiment, the method 800 ends. If an uncommitted save set lock file is found, then in operation 840 the method 800 can attempt to look up a metadata record that represents the starting of a backup.

In operation 845, it is determined whether the metadata record for the backup was found. If not, then the method 800 resumes at operation 855 of FIG. 8B. If, in operation 845, the metadata record for the backup was found, then in operation 850 the metadata record can be displayed to the user. In operation 855, the method 800 can scan for save set data. In an embodiment, the scan can be limited to only the top level directory 542. In an embodiment, the scan can include a subdirectory 552 of the top level directory 542. In yet another embodiment, the scan include all subdirectories of the top level directory 542. Save set data can include save sets and metadata corresponding to save sets.

In operation 860, it can be determined whether any uncommitted save set files were found. If in operation 860 uncommitted save set files were found, then in operation 865 the save set filename(s) and/or metadata (if found) corresponding to the save set file(s) can be displayed to the user. In operation 870, the user can confirm whether to proceed with deleting uncommitted save set data. Save set data can include save set files, metadata records related to the uncommitted save set files, index files, and lock files. If, in operation 870, the user confirms that uncommitted save set data should be deleted, then in operation 875 save set data (including save sets, metadata, index files, lock files, or any combination thereof) can be deleted on the storage device 532. In operation 880, an optional log can be generated of the save set data that was deleted.

Figure 9:
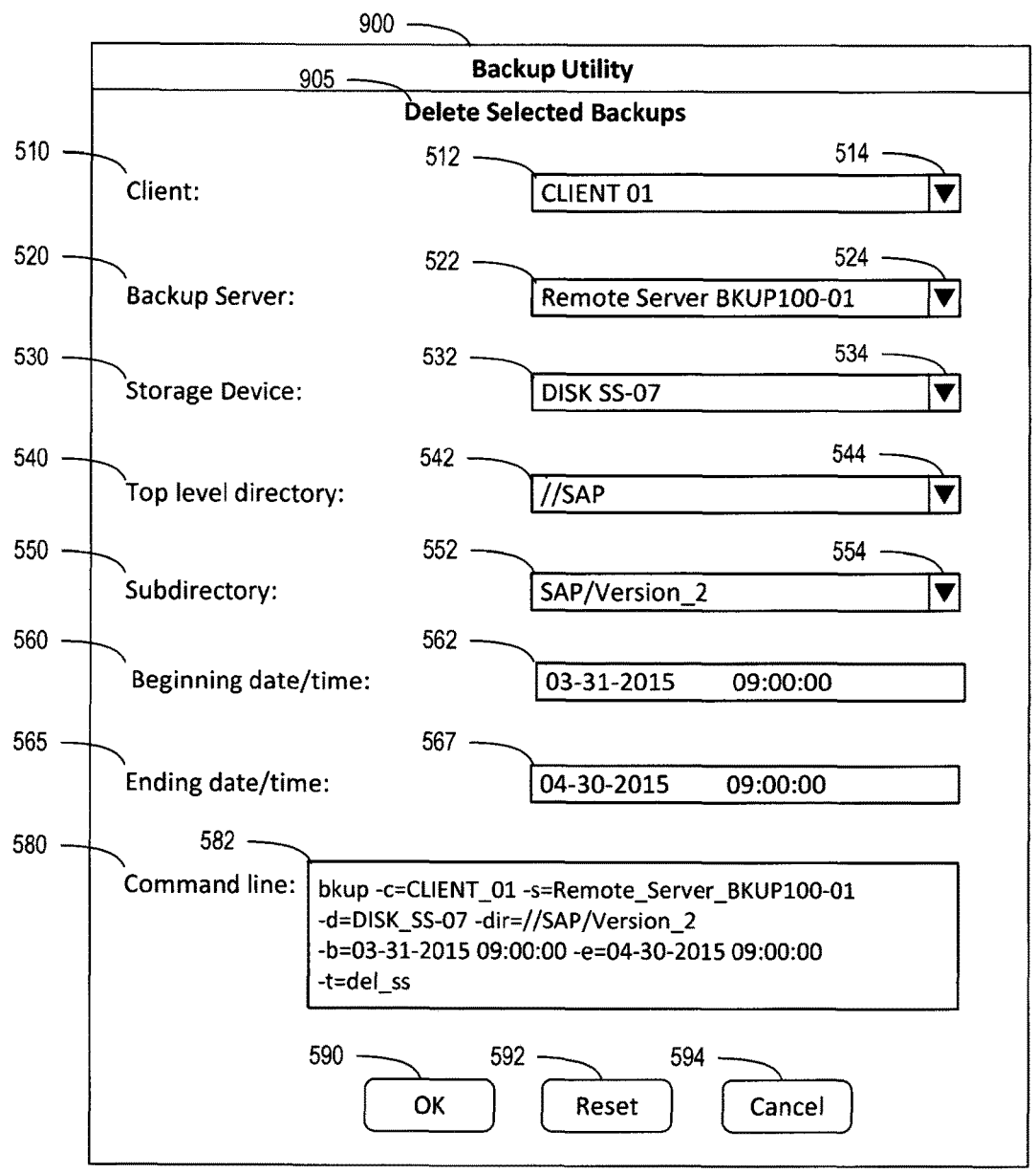
FIG. 9 illustrates, in block diagram form, a GUI of a backup utility application for deleting selected save sets of one or more previous backups, according to some embodiments.

FIG. 9 illustrates, in block diagram form, a GUI 900 of a backup utility application 270 for deleting selected save sets of one or more previous backups, according to some embodiments.

GUI 900 can be used to delete selected save sets that were previously generated during a backup of data of a client device 200, or a virtual machine 250 (interchangeably, "client device 512"). After a period of time, previously backed up data may no longer be useful to a user. In such case, it may be preferable to delete selected save sets, and associated metadata, to free up space on a storage device 260. Backup may no longer be useful for a wide variety of reasons, such as the application that generated the backup data has been upgraded and uses an incompatible data format after the upgrade, or multiple instances of more recent backup data have been generated, or the selected backup data has been previously archived to an inexpensive storage.

In an embodiment, GUI 900 have can include a field 510 for specifying a client device 512 that may have previously generated one or more backups that each include one or more save sets. Specifying a client device 512 can ensure that only save sets generated by the client device 512 can be deleted by the backup utility. For example, if the storage device 532 is attached to a backup server 522, then specifying a client device 512 can ensure that only save sets generated by this client device 512 will be affected on the storage device 532 of the backup server 522. Further, a backup policy 330 or account 320 associated with the client device 512 may enforce a rule that the client device 512 only has permission to delete save sets from a storage device 532 coupled to the backup server 522 that the client device 512 initially generated. If the backup utility 270 is being initiated on a particular client device 512, then client device field 512 can default to the particular client device 512, e.g. "CLIENT 01." In such case, drop down arrow 514 may not be shown or may be an inactive control. If the backup utility 270 is being initiated from a remote administration device 110, the drop down arrow 514 may populate with a drop down list of client devices 512 to select from for deleting of save sets. If the backup utility 270 is being initiated from remote administration device 110, then drop down list 514 may populate with a list of client devices 512 for which the particular administrator is authorized to delete selected save sets.

In field 520, a target backup server 522 may be selected. A drop down arrow 524 may display a drop down list 522 of available servers to which the client device 512 is coupled. In an embodiment, the drop down list 522 may only include backup servers 522 that the client device 512 is permitted to delete save sets upon. In an embodiment, a default backup server selection 522 can be "no server (direct attached storage)" meaning that the backup utility 270 will search for save sets on a storage device 532 that is directly coupled to client device 512. In an embodiment, a backup server 522 selection can include "Cloud Storage." If cloud storage 130 is selected, a pop-up screen may prompt the user for an account log in credential. If a client device 512 is not currently connected to a network 120, or if no backup server 522 is found that the client device 512 is authorized to use, then the drop down arrow 524 may be disabled or not shown, and the backup server value 522 may show "no server (direct attached storage)."

In field 530, a storage device 532 may be selected from a drop down list 534. If, in backup server field 522, "no server (direct attached storage)" is displayed, then in field 532, drop down arrow 534 may display a drop down list 534 of storage devices 532 that are directly coupled to client device 512. If, in backup server field 522, a backup server 522 was selected, then in storage device field 530 a drop down list 534 of storage devices 532 that are available to the selected backup server 532 may be displayed in response to selecting drop down arrow 534.

In field 540, a top level directory on client device 512 can be selected that specifies where backup utility 270 is to find and delete save sets. In an embodiment, drop down arrow 544 can display a drop down list 542 of top level directories where save sets may be found on the selected storage device 532. Top level directories where save sets may be found can be determined by the client device 512 performing a scan of the storage device 532. In an embodiment, drop down arrow 544 can generate a drop down list 542 of top level directories to which the user has previously performed one or more backups on the selected storage device 532. In an embodiment, drop down arrow 544 can be replaced, or supplemented, with a "Browse" button that allows a user to navigate to a top level directory where the save sets are to be found and deleted.

In field 550, a subdirectory of the top level directory can be specified that identifies where save sets may be found on the selected storage device 532. In an embodiment, drop down arrow 554 can populate a drop down list 552 of subdirectories of top level directory 542. In an embodiment, drop down arrow 554 can populate a drop down list of subdirectories that are deeper than immediate sub-directories of top level directory 542. For example, drop down arrow 554 may activate a drop down list 552 of all subdirectories, at any depth, that the user has previously performed a backup to, and thus may have save sets to be deleted.

In field 560, a beginning date/time can be specified that determines a beginning point for a time interval for selecting save sets to be deleted. In field 565, an ending date/time can be specified that determines an ending point for a time interval for selecting save sets to be deleted. In an embodiment, the beginning date/time value can be omitted and the time interval can be construed as "up to this ending date."

In field 580, a text equivalent of a command to delete selected save sets can be generated from the fields of the GUI 900. For example, backup utility "bkup" can perform a delete selected save sets function "-t=del_ss" for client device "-c=CLIENT_01" at backup server "-s=Remote_Server_BKUP100-01" on storage device "-d=DISK_SS-07" of top level directory and subdirectory "-dir=//SAP/Version_2," beginning from "-b=03-31-2015 09:00:00" and ending at "-e=04-30-2015 09:00:00." In an embodiment, a user can edit the generated command 580. In an embodiment, edits to the generated command 580 can be reflected in the corresponding fields of the GUI 900. In an embodiment, edits to the generated command 580 can be reflected in the corresponding fields of the GUI 900. In an embodiment, edits to the generated command 580 can override the selections in fields 510-572. In an embodiment, edits to the generated command 580 can be limited by a user's privilege set to edit generated commands, or edit any particular field or values of a field 510-572, above.

A user can then select the OK button 590 to delete uncommitted save sets in accordance with the fields of the GUI 900, or select the Reset button 592 to reset the fields of the GUI 900, or select Cancel 594 to exit the backup utility. Selecting OK 590 can cause the backup utility to delete selected save sets in accordance with the method described below with reference to FIG. 10. Alternatively, the GUI as shown in FIG. 9 can also be utilized to allow a user to specify a time period during which one or more save sets were previously backed up and stored in the system. In response, the system scan the appropriate directory or directories to locate the save sets that were backed up during that particular timer period. A list of located save sets is then transmitted to a user device of the user to be displayed therein. The user can then select some or all of the save set to be deleted from the system. In response, the system then commits deleting the selected save sets. In an embodiment, selecting the Reset button 592 can cause the fields of the GUI 900 to reset to default values for the backup utility 270. In an embodiment, selecting the Reset button 592 can cause the fields of the GUI 900 to reset to default values for the current state of the client device 200. For example, the client device 200 may not be attached to a network 120 and may have only one storage device 532 directly attached to the client device 512. In such case, selecting Reset may cause field 510 to display the client's name, field 520 may display "no server attached," and field 530 may display the name of the attached storage device 532. In an embodiment, selecting the Reset button 592 can cause the fields of the GUI 900 to reset to default values for a policy 330 associated with the client device 512. In such case, drop down lists may be populated with values obtained from the policy.

Figure 10:
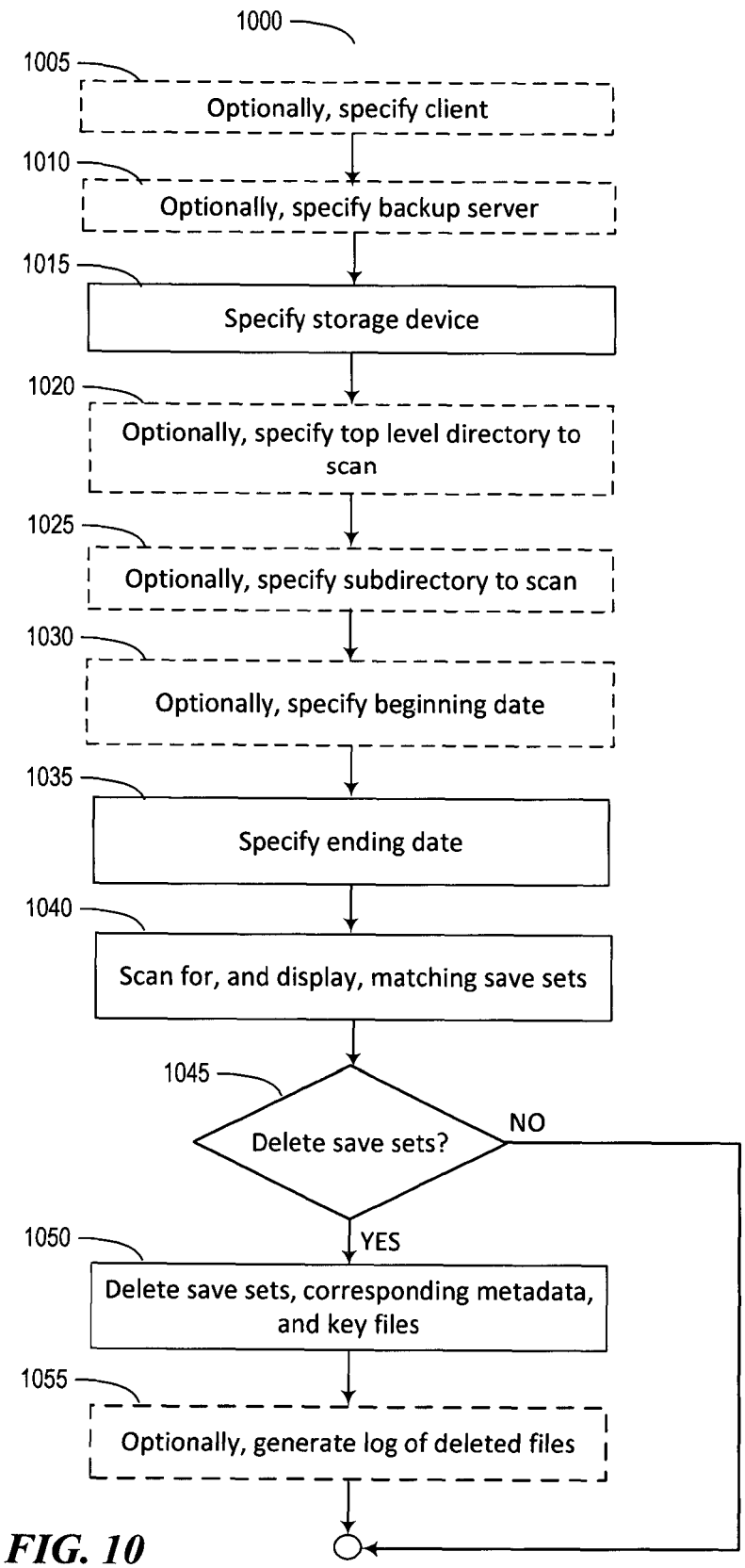
FIG. 10 illustrates, in block form, a flow chart of a method of deleting selected save sets of one or more previous backups, according to some embodiments.

FIG. 10 illustrates, in block form, a flow chart of a method 1000 of deleting selected save sets of one or more previous backups, according to some embodiments. Parameters for generating a command to delete selected save sets can be generated using graphical user interface (GUI) 900 described above with reference to FIG. 9. Process 1000 may be performed by processing logic that includes hardware (e.g. circuitry, dedicated logic, etc.), software (e.g., embodied on a non-transitory computer readable medium), or a combination thereof. For example, process 1000 may be performed by any of the systems as shown in FIGS. 2-3.

In operation 1005, a client device 512 can optionally be specified for which selected save sets are to be deleted. If the selected save sets to be deleted are located on a storage device 532 that is directly attached to the client device 512 that is deleting the selected save sets, then the client device 512 need not be specified. If the selected save sets are located on a storage device 532 coupled to a backup server 522, then in some embodiments, the client device 512 can be specified to ensure that only selected save sets associated with this client device 512 are deleted from storage device 532 coupled to backup server 522. If the method 1000 is being requested from an remote administration device 110, then the remote administrator may be required to specify a client device 512 and only selected save sets associated with the client device 512 may be deleted.

In operation 1010, a target backup server 522 can optionally be specified that has a storage device 532 that may have one or more selected save sets stored thereon. If a backup server 522 is not specified, or is not available to the client device 512, then a direct-attached storage device 532 can be specified in operation 1015.

In operation 1015, a storage device 532 can be specified on which the selected save sets may be found and deleted. Storage device 532 can be directly attached to client device 512. In an embodiment, client device 512 can be coupled to a backup server 522, optionally specified in operation 1010, and storage device 532 can be coupled to the backup server 522.

In operation 1020, a top level directory 542 on the storage device 532 can be specified where the selected save sets to delete may be found. In operation 1025, a subdirectory 552 of the top level directory 542 can optionally be specified. The subdirectory can indicate where, on the storage device 532, the selected save sets to delete may be found.

In operation 1030, an optional beginning date/time may be specified that defines the earliest date/time to search for save sets to be selected for deletion. In operation 1035, an ending date/time can be specified that defines a latest date/time to search for save sets to be selected for deletion. In an embodiment, only the ending date/time need be specified.

In operation 1040, the method 1000 can scan for, and display, save sets that match the criteria specified in operations 1005-1035. In operation 1045, a user can confirm whether to delete the displayed save sets. If, in operation 1045, the user confirms that the displayed save sets are to be deleted, then in operation 1050 the displayed save sets, corresponding metadata, and key files can be deleted from storage device 532. In operation 1055, the method can optionally generate a log of deleted save sets, metadata, and key files.

FIG. 11 illustrates, in block form, GUI 1100 of a backup utility application 270 for updating metadata of a backup generated by a previous (or first) version of an application, to a metadata format for a new (or second) version of the application, according to some embodiments.

GUI 1100 can be used to update metadata associated with previously stored save sets to a format that is compatible with a new (or second) version of metadata for an application. Metadata associated with a first backup of an application may change to a second format if the application is updated, e.g. For example, when an application is updated, the updated version of the application may specify a different directory on the client device 512 for storing application data. If a client device 512 backups up the application data to a storage device 532, then the client device 512 updates the application software, and then client device's existing copy of the data is corrupted or lost, e.g. during the application upgrade process, a user will want to restore the application data from the backup that was performed before the update of the application. But, backup metadata specifies the wrong target directory on the client device 512 for application data for the updated application. To address this issue, GUI 1100 can update metadata associated with an existing backup to match the format of metadata needed to properly restore the backup for use with the upgraded application software. In addition, the updated application may require additional metadata, not just different metadata, than the previous version. For example, an upgraded application may embed a license key in the metadata for backups of the application data. GUI 1100 can be used to update, and add or delete, metadata associated with an existing backup.

In an embodiment, GUI 1100 have can include a field 510 for specifying a client device 512 that may have previously generated one or more backups that each include one or more save sets and associated metadata. Specifying a client device 512 can ensure that only save sets and metadata generated by the client device 512 can be updated by the this client device 512. For example, if the storage device 532 is attached to a backup server 522, then specifying a client device 512 can ensure that only save sets and metadata generated by this client device 512 will be updated on the storage device 532 of the backup server 522. Further, a backup policy 330 or account 320 associated with the client device 512 may enforce a rule that the client device 512 only has permission to update save sets and metadata from a storage device 532 coupled to the backup server 522 that the client device 512 initially generated. If the backup utility 270 is being initiated on a particular client device 512, then client device field 512 can default to the particular client device 512, e.g. "CLIENT 01." In such case, drop down arrow 514 may not be shown or may be an inactive control. If the backup utility 270 is being initiated from a remote administration device 110, the drop down arrow 514 may populate with a drop down list of client devices 512 to select from for updating metadata of save sets. If the backup utility 270 is being initiated from remote administration device 110, then drop down list 514 may populate with a list of client devices 512 for which the particular administrator is authorized to update metadata associated with save sets.

In field 520, a target backup server 522 may be selected. A drop down arrow 524 may display a drop down list 522 of available servers to which the client device 512 is coupled. In an embodiment, the drop down list 522 may only include backup servers 300 that the client device 512 is permitted to update metadata associated with save sets upon. In an embodiment, a default backup server selection 522 can be "no server (direct attached storage)" meaning that the backup utility 270 will search for metadata to update on a storage device 532 that is directly coupled to client device 512. In an embodiment, a backup server 522 selection can include "Cloud Storage." If cloud storage 130 is selected, a pop-up screen may prompt the user for an account log in credential. If a client device 512 is not currently connected to a network 120, or if no backup server 522 is found that the client device 512 is authorized to use, then the drop down arrow 524 may be disabled or not shown, and the backup server value 522 may show "no server (direct attached storage)."

In field 530, a storage device 260 may be selected from a drop down list 532. If, in backup server field 522, "no server (direct attached storage)" is displayed, then in field 532, drop down arrow 534 may display a drop down list 532 of storage devices 260 that are directly coupled to client device 512. If, in backup server field 522, a backup server 300 was selected, then in storage device field 530 a drop down list 532 of storage devices 260 that are available to the selected backup server 522 may be displayed in response to selecting drop down arrow 534.

In field 540, a top level directory 542 on client device 512 can be selected that specifies where backup utility 270 is to find and update metadata associated with save sets. In an embodiment, drop down arrow 544 can display a drop down list 542 of top level directories where metadata associated with save sets may be found on the selected storage device 532. Top level directories where metadata associated with save sets may be found can be determined by the client device 512 performing a scan of the storage device 532 specified in field 532, above. In an embodiment, drop down arrow 544 can generate a drop down list 542 of top level directories to which the user has previously performed one or more backups on the selected storage device 532. In an embodiment, drop down arrow 544 can be replaced, or supplemented, with a "Browse" button that allows a user to navigate to a top level directory where the metadata associated with save sets is to be found and updated.

In field 550, a subdirectory of the top level directory 542 can be specified that identifies where metadata associated with save sets may be found on the selected storage device 532. In an embodiment, drop down arrow 554 can populate a drop down list 552 of subdirectories of top level directory 542. In an embodiment, drop down arrow 554 can populate a drop down list of subdirectories that are deeper than immediate sub-directories of top level directory 542. For example, drop down arrow 554 may activate a drop down list 552 of all subdirectories, at any depth, that the user has previously performed a backup to, and thus may have metadata associated with save sets to be updated.

In field 560, a scheduled starting date/time for beginning the metadata update process can be specified. In an embodiment, field 560 can be left blank and the update process will proceed in response to the user selecting the OK button 590.

In field 570, an application-specific selection can be made that limits the type of metadata associated with save sets to be updated, e.g. SQL data. In an embodiment, drop down arrow 574 can populate a list of applications that are available on client machine 512. In an embodiment, drop down arrow 574 can populate a list of applications for which a metadata update 330 is stored on backup server 522 in relation to the client device listed in field 510. In an embodiment, drop down arrow 574 can populate a list of applications for which the client device 200 has previously had backups performed.

In field 580, a text equivalent of a command to update metadata associated with save sets can be generated from the fields of the GUI 1100. For example, backup utility "bkup" can perform an update of metadata associated with save sets function "-t=upd" for client device "-c=CLIENT_01" at backup server "-s=Remote_Server_BKUP100-01" on storage device "-d=DISK_SS-07" of top level directory and subdirectory "-dir=//SAP/Version_2," beginning at date/time "-b=03-31-2015 09:00:00" for application "-a=SAP." In an embodiment, a user can edit the generated command 580. In an embodiment, edits to the generated command 580 can be reflected in the corresponding fields of the GUI 1100. In an embodiment, edits to the generated command 580 can be reflected in the corresponding fields of the GUI 1100. In an embodiment, edits to the generated command 580 can override the selections in fields 510-572. In an embodiment, edits to the generated command 580 can be limited by a user's privilege set to edit generated commands, or edit any particular field or values of a field 510-572, above.

A user can then select the OK button 590 to update metadata associated with save sets for an application in accordance with the fields of the GUI 1100, or select the Reset button 592 to reset the fields of the GUI 1100, or select Cancel 594 to exit the backup utility. Selecting OK 590 can cause the backup utility to update metadata associated with selected save sets in accordance with the method described below with reference to FIG. 12. In an embodiment, selecting the Reset button 592 can cause the fields of the GUI 1100 to reset to default values for the backup utility 270. In an embodiment, selecting the Reset button 592 can cause the fields of the GUI 1100 to reset to default values for the current state of the client device 512. For example, the client device 512 may not be attached to a network 120 and may have only one storage device 532 directly attached to the client device 512. In such case, selecting Reset may cause field 510 to display the client's name, field 520 may display "no server attached," and field 530 may display the name of the attached storage device 532. In an embodiment, selecting the Reset button 592 can cause the fields of the GUI 1100 to reset to default values for a policy 330 associated with the client device 512. In such case, drop down lists may be populated with values obtained from the policy.

In an embodiment, the backup utility to update metadata associated with selected save sets can be run automatically, the first time that a user uses an application that has been upgraded. In such an embodiment, a command line string, such as field 580, can be generated at the first run-time of the upgraded application. In an embodiment, backup server 522 can detect that client device 512 has upgraded an application, and can automatically initiate the metadata update process in response to detecting that the client device 512 successfully upgraded the application software. In an embodiment, edits to the generated command 580 can be reflected in the corresponding fields of the GUI. In an embodiment, edits to the generated command 580 can override the selections in fields 510-572. In an embodiment, edits to the generated command 580 can be limited by a user's privilege set to edit generated commands, or edit any particular field or values of a field 510-572, above.

FIG. 12 illustrates, in block form, a method 1200 of updating metadata of a backup generated by a previous version of an application to a metadata usable by an upgraded version of the application, according to some embodiments. Parameters for a command to update backup metadata can be generated using graphical user interface (GUI) 1100, described above with reference to FIG. 11. Process 1200 may be performed by processing logic that includes hardware (e.g. circuitry, dedicated logic, etc.), software (e.g., embodied on a non-transitory computer readable medium), or a combination thereof. For example, process 1200 may be performed by any of the systems as shown in FIGS. 2-3.

In operation 1205, a client device 512 can be specified for the updating of metadata associated with save sets of a previously stored backup. In operation 1210, a target backup server 300 can optionally be specified that has a storage device 532 coupled to the backup server 522, where the metadata to be updated may be found. If a backup server 522 is not specified, or is not available, then a direct-attached storage device 532 can be specified in operation 1215.

In operation 1215, a storage device 532 can be specified on which the metadata to be updated may be found. Storage device 532 can be directly attached to client device 512. In an embodiment, client device 512 can be coupled to a backup server 522, optionally specified in operation 1210, and storage device 532 can be coupled to the backup server 522. In operation 1220, a top level directory on the client device 512 can be specified. The top level directory can indicate where, on the storage device 532, the metadata to be updated may be found.

In operation 1225, a subdirectory of the top level directory can optionally be specified. The subdirectory can indicate where, on the storage device 532, the data to be backed up may be found. In operation 1230, a scheduled staring date/time can optionally be specified that indicates when the update of the metadata is to begin. For example, the update of metadata may be scheduled to begin at off-hours, when backup server 522 utilization may otherwise be low. In an embodiment, the update of metadata can begin in response to a user selecting the "OK" button 590 from the GUI 1100, as described with reference to FIG. 11, above.

In operation 1235, a type of application can be specified for which metadata is to be updated can be specified. The type of application can cause the client device 512, or backup server 522, to load and execute an application-specific module, e.g. 271-273, that is configured to update metadata of previous backups and save sets. An application-specific module can determine, e.g., which metadata is to be updated, added, deleted or otherwise modified so that the previous backups can be used with the upgraded software. Application-specific modules can be stored on a backup server 522 and can be deployed on request.

In operation 1240, the method 1200 can retrieve and load an application-specific component. The component may have been installed on a client device 512 when the application was upgraded. In another embodiment, when this method 1200 is run, the application-specific component can be requested, received, and loaded for execution from a backup server 522. In operation 1245, it can be determined whether application metadata was found to update. If in operation 1245 application metadata was found to update, then in operation 1250 the application metadata can be updated.

Figure 13:
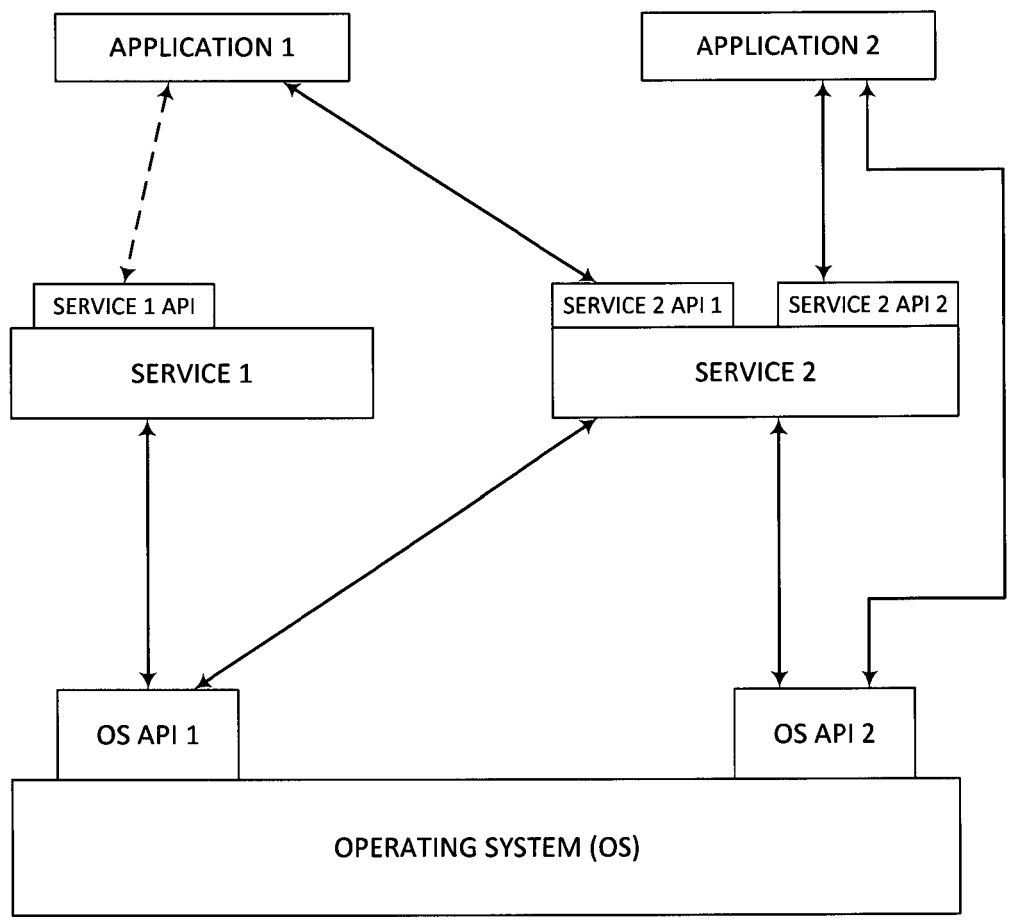
FIG. 13 illustrates an exemplary embodiment of a software stack usable in some embodiments of the invention.

In FIG. 13 ("Software Stack"), an exemplary embodiment, applications can make calls to Services A or B using several Service APIs and to Operating System (OS) using several as APIs, A and B can make calls to as using several as APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Also note that the GUIs described above may be maintained and presented by any of the systems as shown in FIGS. 2-3. The GUIs may be rendered in response to a request received from a client device, for example, for accessing resources maintained by a server. The information representing the GUIs is then transmitted to the client device to be displayed at the client device. The user interactions with the GUIs are captured and received at the server from the client device. Note that the GUIs are shown for the purpose of illustration only, other formats or layouts of the GUIs may also be implemented. Furthermore, a user interface represented by the GUIs can also be implemented in other forms, such as, for example, an application programming interface (API) or a command line interface (CLI).

Figure 14:
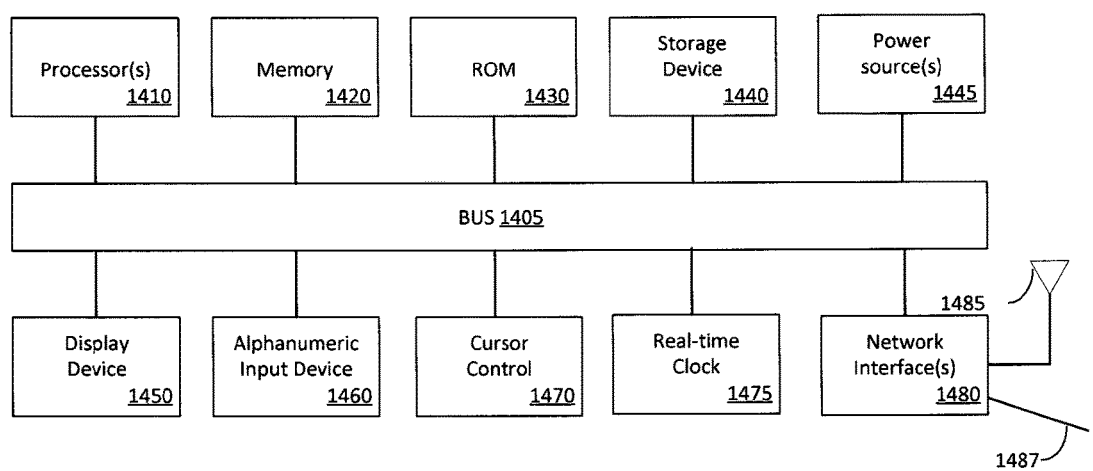
FIG. 14 is a block diagram of one embodiment of a computing system that can be used to implement embodiments described herein.

FIG. 14 is a block diagram of one embodiment of a computing system 1400. The computing system illustrated in FIG. 14 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 14 may be used to provide the computing device and/or the server device.

Computing system 1400 includes bus 1405 or other communication device to communicate information, and processor 1410 coupled to bus 1405 that may process information.

While computing system 1400 is illustrated with a single processor, computing system 1400 may include multiple processors and/or co-processors 1410. Computing system 1400 further may include random access memory (RAM) or other dynamic storage device 1420 (referred to as main memory), coupled to bus 1405 and may store information and instructions that may be executed by processor(s) 1410. Main memory 1420 may also be used to store temporary variables or other intermediate information during execution of instructions by processor 1410.

Computing system 1400 may also include read only memory (ROM) and/or other static storage device 1440 coupled to bus 1405 that may store static information and instructions for processor(s) 1410. Data storage device 1440 may be coupled to bus 1405 to store information and instructions. Data storage device 1440 such as flash memory or a magnetic disk or optical disc and corresponding drive may be coupled to computing system 1400.

Computing system 1400 may also be coupled via bus 1405 to display device 1450, such as a cathode ray tube (CRT) or liquid crystal display (LCD), to display information to a user. Computing system 1400 can also include an alphanumeric input device 1460, including alphanumeric and other keys, which may be coupled to bus 1405 to communicate information and command selections to processor(s) 1410. Another type of user input device is cursor control 1470, such as a touchpad, a mouse, a trackball, or cursor direction keys to communicate direction information and command selections to processor(s) 1410 and to control cursor movement on display 1450. Computing system 1400 may further include a real-time clock 1475. The real-time clock 1475 may be used for generating date/time stamps for data records, computing elapsed time, and other time-keeping functions. A real-time clock 1475 can be a battery-backed chipset with a settable date and time. Alternatively, a real-time clock 1475 may include logic to retrieve a real-time from a network source such as a server or an Internet server via network interfaces 1480, described below.

Computing system 1400 further may include one or more network interface(s) 1480 to provide access to a network, such as a local area network. Network interface(s) 1480 may include, for example, a wireless network interface having antenna 1485, which may represent one or more antenna(e). Computing system 1400 can include multiple wireless network interfaces such as a combination of WiFi, Bluetooth® and cellular telephony interfaces. Network interface(s) 1480 may also include, for example, a wired network interface to communicate with remote devices via network cable 1487, which may be, for example, an Ethernet cable, a coaxial cable, a fiber optic cable, a serial cable, or a parallel cable.

In one embodiment, network interface(s) 1480 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1480 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method comprising:
   presenting, on a client device, a user interface that receives user selection criteria to delete one or more save sets of a backup of client device data that meet the selection criteria;
   receiving, on the client device, a request to delete one or more save sets of client device data in a backup stored in a storage system, wherein the storage system stores a plurality of backups from a plurality of client devices, the request comprising user selection criteria to delete one or more save sets of a backup of client device data and metadata in a metadata database associated with the backup, the selection criteria specifying at least a user selected time interval of when the save sets were generated and an identification of the client device, wherein a save set comprises a storage container containing one or more save files;

in response to receiving the request, searching the metadata database for one or more save set metadata records matching the user selection criteria specified by the request and the identification of the user client device;

for each save set metadata record matching the user selection criteria:
  determining whether the user is permitted to delete a save set associated with the save set metadata record;
  in response to determining that the user is permitted to delete the save set associated with the save set metadata:
    determining a filename of a save set corresponding to the save set metadata record;
    determining, from the save set metadata record, a directory of one or more keys in the metadata database, each key in the directory comprising a pointer to a save file within the save set;
    deleting the one or more keys, and the directory that held the one or more keys, from the metadata database;
    deleting the save set on the storage device; and
    deleting the save set metadata record from the metadata database.

2. The method of claim 1, wherein determining whether the user is permitted to delete the save set associated with the save set metadata record comprises:
  accessing a policy associated with the user;
  determining an application that generated the save set associated with the save set metadata record;
  determining whether the policy permits the user to the delete the save set, based at least in part on the application that generated the save set.

3. The method of claim 1, further comprising:
  in response to determining that the user is not permitted to delete the save set associated with the metadata record, notifying the user via the user interface that the user is not permitted to delete the save set associated with the save set metadata record and that the save set associated with the metadata record was not deleted.

4. The method of claim 2, wherein the selection criteria comprises a specified client device, and a backup policy enforces a rule that the client device only has permission to delete save sets from a storage device that the client device initially generated.

5. The method of claim 1, wherein the one or more metadata records matching the user selection criteria form a root index of all save files in all save sets on the storage system for the identified client device.

6. The method of claim 1, wherein the user selection criteria further specifies a backup server to which the storage device is communicatively coupled, and save sets are deleted from only the backup server specified in the user selection criteria.

7. The method of claim 1, wherein determining one or more save sets comprises determining save sets for a specified application.

8. A non-transitory computer-readable medium programmed with executable instructions that, when executed by a processing system having at least one hardware processor, perform operations comprising:

presenting, on a client device, a user interface that receives user selection criteria to delete one or more save sets of a backup of client device data that meet the selection criteria;

receiving, on the client device, a request to delete one or more save sets of the client device in a backup stored in a storage system, wherein the storage system stores a plurality of backups from a plurality of client devices, the request comprising user selection criteria to delete one or more save sets of a backup of client device data and metadata associated with the one or more save sets, the selection criteria specifying at least a user selected time interval of when the save sets were generated and an identification of the client device, wherein a save set comprises a storage container containing one or more save files;

in response to receiving the request, searching the metadata database for one or more save set metadata records matching the user selection criteria specified by the request and the identification of the client device;

for each save set metadata record matching the user selection criteria:
    determining whether the user is permitted to delete a save set associated with the save set metadata record;
    in response to determining that the user is permitted to delete the save set associated with the save set metadata:
      determining a filename of a save set corresponding to the save set metadata record;
      determining, from the save set metadata record, a directory of one or more keys in the metadata database, each key in the directory comprising a pointer to a save file within the save set;
      deleting the one or more keys, and the directory that held the one or more keys, from the metadata database;
      deleting the save set on the storage device; and
      deleting the save set metadata record from the metadata database.

9. The medium of claim 8, wherein determining whether the user is permitted to delete the save set associated with the save set metadata record comprises:
  accessing a policy associated with the user;
  determining an application that generated the save set associated with the save set metadata record;
  determining whether the policy permits the user to the delete the save set, based at least in part on the application that generated the save set.

10. The medium of claim 8, further comprising:
  in response to determining that the user is not permitted to delete the save set associated with the metadata record, notifying the user via the user interface that the user is not permitted to delete the save set associated with the save set metadata record and that the save set associated with the metadata record was not deleted.

11. The medium of claim 9, wherein the selection criteria comprises a specified client device, and a backup policy enforces a rule that the client device only has permission to delete save sets from a storage device that the client initially generated.

12. The medium of claim 8, wherein the or more metadata records matching the user selection criteria form a root index of all save files in all save sets on the storage system for the identified client device.

13. The medium of claim 8, wherein the user selection criteria further specifies a backup server to which the storage device is communicatively coupled, and the save sets are deleted from only the backup server specified in the user selection criteria.

14. The medium of claim 8, wherein determining one or more save sets comprises determining save sets for a specified application.

15. A system comprising a processing system having at least one hardware processor coupled to a memory programmed with executable instructions that, when executed by the processing system, perform operations comprising:
   presenting, on a client device, a user interface that receives user selection criteria to delete one or more save sets of a backup of client device data that meets the selection criteria;
   receiving a request to delete one or more save sets of the client device data in a backup stored in a storage system, wherein the storage system stores a plurality of backups from a plurality of client devices, the request comprising user selection criteria specifying to delete one or more save sets of a backup of client device data and the metadata associated with the one or more of the save sets, the selection criteria specifying at least a user selected time interval of when the save sets were generated and an identification of the client device, wherein a save set comprises a storage container containing one or more save files;
   in response to receiving the request, searching the metadata database for one or more save set metadata records matching the user selection criteria specified by the request and the identification of the client device;
   for each save set metadata record matching the user selection criteria:
      determining whether the user is permitted to delete a save set associated with the save set metadata record;
      in response to determining that the user is permitted to delete the save set associated with the save set metadata:
         determining a filename of a save set corresponding to the save set metadata record;
         determining, from the save set metadata record, a directory of one or more keys in the metadata database, each key in the directory comprising a pointer to a save file within the save set;
         deleting the one or more keys, and the directory that held the one or more keys, from the metadata database;
         deleting the save set on the storage device; and
         deleting the save set metadata record from the metadata database.

16. The system of claim 15, wherein determining whether the user is permitted to delete the save set associated with the save set metadata record comprises:
   accessing a policy associated with the user;
   determining an application that generated the save set associated with the save set metadata record;
   determining whether the policy permits the user to the delete the save set, based at least in part on the application that generated the save set.

17. The system of claim 15, further comprising:
   in response to determining that the user is not permitted to delete the save set associated with the metadata record, notifying the user via the user interface that the user is not permitted to delete the save set associated with the save set metadata record and that the save set associated with the metadata record was not deleted.

18. The system of claim 16, wherein the selection criteria comprises a specified client device, and a backup policy enforces a rule that the client device only has permission to delete save sets from a storage device that the client device initially generated.

19. The system of claim 15, wherein one or more metadata records the user selection criteria form a root index of all save files in all save sets on the storage system for the identified client device.

20. The system of claim 15, wherein the user selection criteria further specifies a backup server to which the storage device is communicatively coupled, and save sets are deleted from only the backup server specified in the user selection criteria.

21. The system of claim 15, wherein determining one or more save sets comprises determining save sets for a specified application.

* * * * *